(12) United States Patent
Cichielo et al.

(10) Patent No.: US 10,686,949 B2
(45) Date of Patent: Jun. 16, 2020

(54) SYSTEM AND METHOD FOR REMOTE FAX INTERCONNECT

(71) Applicant: etherFAX, LLC, Holmdel, NJ (US)

(72) Inventors: Robert N. Cichielo, Asbury, NJ (US);
Paul J. Banco, Colts Neck, NJ (US);
Emil Sturniolo, Medina, OH (US)

(73) Assignee: etherFAX, LLC., Holmdel, NJ (US)

( * ) Notice: Subject to any disclaimer, the term of this patent is extended or adjusted under 35 U.S.C. 154(b) by 0 days.

(21) Appl. No.: 16/063,425

(22) PCT Filed: Dec. 19, 2016

(86) PCT No.: PCT/US2016/067447
§ 371 (c)(1),
(2) Date: Jun. 18, 2018

(87) PCT Pub. No.: WO2017/106813
PCT Pub. Date: Jun. 22, 2017

(65) Prior Publication Data
US 2019/0007565 A1 Jan. 3, 2019

Related U.S. Application Data

(60) Provisional application No. 62/269,826, filed on Dec. 18, 2015.

(51) Int. Cl.
*H04L 12/66* (2006.01)
*H04N 1/00* (2006.01)
(Continued)

(52) U.S. Cl.
CPC ....... *H04N 1/00217* (2013.01); *G06F 13/102* (2013.01); *H04L 29/06* (2013.01);
(Continued)

(58) Field of Classification Search
CPC .......... H04N 1/00214; H04N 1/00244; H04N 1/32411; H04L 67/10
(Continued)

(56) References Cited

U.S. PATENT DOCUMENTS 5,325,527 A 6/1994 Cwikowski et al.
5,552,901 A 9/1996 Kikuchi et al.
(Continued)

FOREIGN PATENT DOCUMENTS

JP 03-044230 12/1997

OTHER PUBLICATIONS

International Search Report for PCT/US2016/067447 dated Apr. 27, 2017, 4 pages.
(Continued)

*Primary Examiner* — Jamares Q Washington
(74) *Attorney, Agent, or Firm* — Nixon & Vanderhye, P.C.

(57) ABSTRACT

Systems and methods for the virtualization, aggregation, enhancement, and distributed processing of facsimile communications. The Remote FAX Interconnect known as etherFAX® is a system and method that allows for the reception and delivery of information to or from one or more facsimile systems using Internet/web based communication protocols such as HTTP(S) as the transport between a cooperating facsimile capable application or hardware and the remotely accessible etherFAX® services.

11 Claims, 12 Drawing Sheets

(51) Int. Cl.
  *H04N 1/32*   (2006.01)
  *H04L 29/08*  (2006.01)
  *G06F 13/10*  (2006.01)
  *H04L 29/06*  (2006.01)
  *H04N 1/44*   (2006.01)

(52) U.S. Cl.
  CPC .............. *H04L 67/02* (2013.01); *H04L 67/10* (2013.01); *H04N 1/0022* (2013.01); *H04N 1/00244* (2013.01); *H04N 1/00281* (2013.01); *H04N 1/32406* (2013.01); *H04N 1/32411* (2013.01); *H04N 1/32432* (2013.01); *H04N 1/4486* (2013.01); *H04L 12/66* (2013.01); *H04N 2201/0093* (2013.01); *H04N 2201/0094* (2013.01)

(58) Field of Classification Search
  USPC ........................................ 358/1.15, 405, 407
  See application file for complete search history.

(56) References Cited

U.S. PATENT DOCUMENTS

| | | | |
|---|---|---|---|
| 5,712,907 | A | 1/1998 | Wegner et al. |
| 5,933,582 | A | 8/1999 | Yamada |
| 8,897,432 | B2 | 11/2014 | Cichielo et al. |
| 2008/0086564 | A1 | 4/2008 | Putman et al. |
| 2013/0287189 | A1* | 10/2013 | Cichielo ............ H04N 1/00095 379/100.17 |
| 2014/0307294 | A1 | 10/2014 | Rebert |

OTHER PUBLICATIONS

Written Opinion of the ISA for PCT/US2016/067447 dated Apr. 27, 2017, 12 pages.

International Preliminary Report on Patentability and Written Opinion of the International Searching Authority dated Jun. 28, 2018, issued in related International Patent Application No. PCT/US2016/067447.
Etherfax: "Hybrid Fax Solutions" URL:https://web.archive.org/web/20150221033834/http://etherfax.net/solutions; Feb. 21, 2015, XP055598280.
Etherfax: "Etherfax Brochure" URL:https://web.archive.org/web/20151110141618/http://etherfax.net:80/resources; Nov. 10, 2015, XP055598316.
Etherfax: "Etherfax DR Overview" URL:https://web.archive.org/web/20150124142950/http://etherfax.net/solutions/etherfax-dr/; Jan. 24, 2015, XP055598286.
Etherfax: "EtherFAX DR Brochure" URL:https://web.archive.org/web/20150124142950/http://etherfax.net/solutions/etherfax-dr/; Jan. 24, 2015, XP055598300.
Etherfax: "Etherfax SEN"—Overview URL:https://web.archive.org/web/20150302020725/http://etherfax.net/solutions/etherfax-sen; Mar. 2, 2015, XP055598302.
Etherfax: "A2E Overview" URL:https://web.archive.org/web/20150302020642/http://etherfax.net/solutions/etherfax-a2e/, Mar. 2, 2015, XP055598281.
Etherfax: "A2E Brochure" URL:https://web.archive.org/web/20150302020642/http://etherfax.net/wp-content/themes/etherfaxv2/dist/assets/resources/etherfax-a2e.pdf; Mar. 2, 2015, XP055598295.
Etherfax: "Etherfax Overview" URL:https://web.archive.org/web/20151110141618/http://etherfax.net:80/resources; Nov. 10, 2015, XP055598312.
Extended European Search Report for corresponding PCT/US2016067447, dated Jul. 3, 2019; 15 pages.
Written Opinion and Search Report from the Intellectual Property Office of Singapore for 11201805167Q, dated Aug. 26, 2019, 8 pages.

* cited by examiner

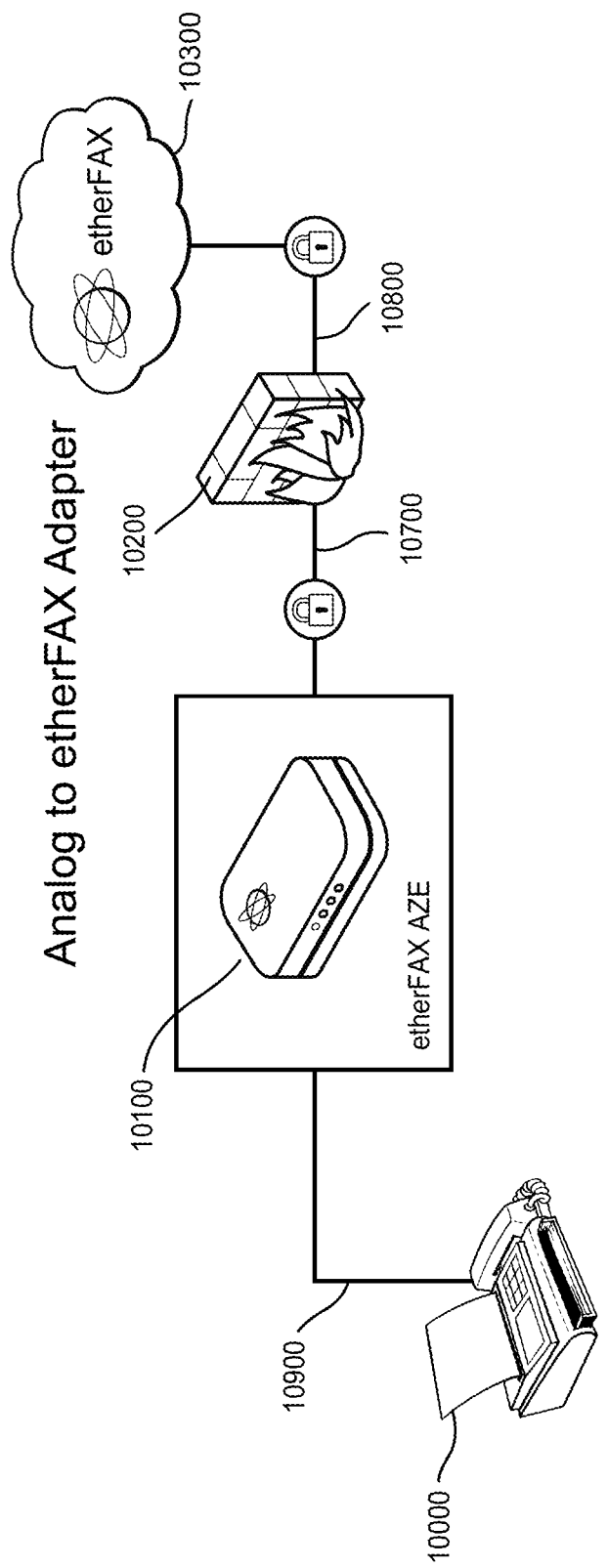
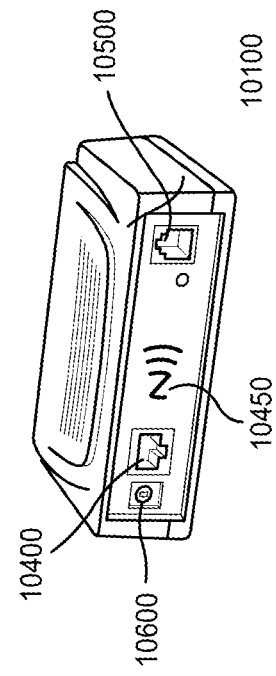
Figure 10
Figure 10A
network interconnect view

End point registration/query information

```
{
  "Route": "+18005551234"
  "FID": "FID00670371"
  "Status": "ACCEPT"
  "AcceptedFormats": [
    "image/tiff*",
    "application/pdf"
  ],
  "Public Key":"3d2a3725b8c9140a3879a467307af3150"
  "Encryption Algorithms":[
    "AES128",
    AES256"
   ],
}
```

Figure 12

SYSTEM AND METHOD FOR REMOTE FAX INTERCONNECT

This application is the U.S. national phase of International Application No. PCT/US2016/067447 filed Dec. 19, 2016, which designated the U.S. and claims benefit to U.S. Provisional Application No. 62/269,826 filed Dec. 18, 2015, the entire contents of each of which are hereby incorporated by reference.

FIELD

This technology relates to FAX (facsimile) communications and more particularly to methods, apparatus, and systems for remote aggregation of FAX communication interconnect technology employing both packet-switched and traditional telephone networking technologies. The technology in some of its aspects further relates to the aggregation of facsimile communications technology, and more particularly, to the enablement of remote access and operations.

BACKGROUND

Facsimile document imaging technology has been commercially available dating to the early 1980's. Scanning an image into a digital representation and communicating that point-to-point from one dedicated facsimile machine to another over the Public Switched Telephone Network (PSTN) is a well understood and widely used technology. While email, social media, Adobe Acrobat document format and other new technologies have supplanted many kinds of facsimile transmissions, facsimile remains a highly viable and important secure way to transmit certain kinds of information. Further improvements are possible.

BRIEF DESCRIPTION OF THE DRAWINGS

The technology can be more fully understood by reading the following detailed description of example non-limiting embodiments with the accompanying drawings, in which like reference indicators are used to designate like elements, and in which:

FIG. 10 is a schematic diagram depicting an example of an etherFAX® analog to etherFAX® (A2E) bridging device that enables traditional and/or third party facsimile systems to further participate in the advantages and improvements of the etherFAX® ecosystem as a provider and/or consumer of facsimile information.

FIG. 10A shows an example non-limiting network interconnect view.

FIG. 12 is an illustrative diagram representing extended attributes that can be registered and queried via etherFax's federate facsimile ecosystem.

DETAILED DESCRIPTION OF EXAMPLE NON-LIMITING EMBODIMENTS

Figure 1:
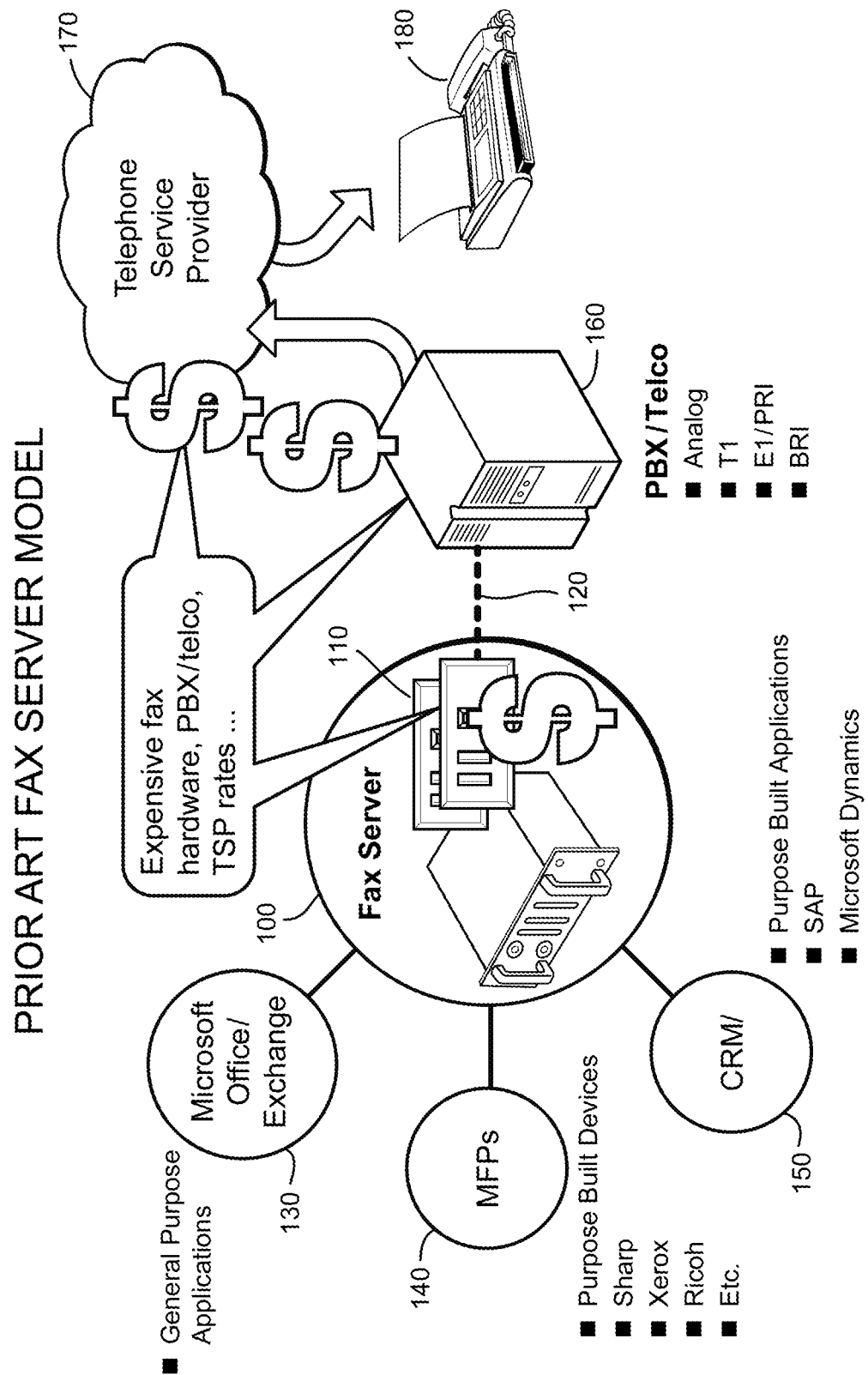
FIGS. 1-5 are drawings from U.S. Pat. No. 8,897,432, the corresponding descriptions of which are incorporated herein by reference.

While far fewer documents are transmitted via facsimile than in the peak of popularity of this transmission mode, many facsimile transmissions continue to be made worldwide. A lot is said for the convenience of inserting a document into a scanner bed and transmitting a copy of the document anywhere across the world. However, to further reduce costs and increase efficiency, there has been a need to develop technology that provides simple aggregation of facsimile communications into a technology known as a FAX Server (FIG. 1). See for example U.S. Pat. No. 5,552,901 (Kikuchi, et al.) and Japanese patent 03-044230 (Tadashi), incorporated herein by reference and see also commonly-assigned U.S. Pat. No. 8,897,432 ("the '432 patent") incorporated herein by reference.

These improvements have allowed consumers to centralize facsimile resources on a corporate network within the organization, enabling desktop computing platforms and other multifunction printing and scanning fax products to take advantage of facsimile services without requiring dedicated fax hardware at each station.

FIG. 1 of the '432 patent shows an example conventional deployment of fax server technology. Briefly, for outgoing documents, fax servers (100) accept documents in a variety of electronic formats generated by different applications or devices (130, 140, 150) and potentially converts them to a necessary facsimile format (typically a black and white image) within specialized hardware and software (100, 110) used for subsequent transmittal over telephone devices, networks and services (160, 120, 170) to at least one peer receiving facsimile system (180). For inbound facsimiles, fax servers (100) receive the inbound facsimile information over telephone devices, networks, and services (160, 120, 170) from peer facsimile devices (180) and potentially convert and store the received transmission for later retrieval or forward the received information via several different electronic formats, to applications (130, 150) such as email, or purpose built devices (140).

Fax server technology is not without its own set of limitations and requirements. Traditionally, these fax servers (100) are under the purview of a business's network and/or telecom administrator. This set of individuals must possesses the correct knowledge for operating these devices, and also for interfacing the technology to both the local computing network infrastructure (130, 140, 150) and interfacing/provisioning the fax server equipment (110) to the telephone company's appropriate type of PSTN/PBX circuit such as PRI/T1/E1/analog line, etc. (120, 160, 170). Given these requirements, the total cost of ownership of these systems, including the recurring fees to interconnect with the telephone carrier network (170), may be prohibitively expensive for many organizations, leaving them at a significant disadvantage. With the plethora of newer voice communications options such as Voice over IP, many businesses are opting to use alternative methods for interconnecting their voice services, not all of which meet the stringent timing requirements of a facsimile transmission.

Along with the total cost of ownership, today, additional requirements are being placed upon individuals by governmental or organizational regulations to ensure information privacy. For instance, in the healthcare market of the U.S., patient information must be kept confidential by the United States Health Insurance Portability and Accountability Act of 1996. Doctors, nurses, office staff, insurance companies, other vendors, and individuals must keep certain information about a patient's healthcare confidential. Other such examples abound across the globe. There is a need for information to be kept "private" when transferring documents via facsimile systems.

To better understand this need, when facsimile systems were initially designed, an originating facsimile system was coupled to a telephony network. In the simplest of installations, to establish communications, the system would outwardly dial a peer facsimile system. This would be accomplished via an organization's chosen telephonic carrier (AT&T, British Telecom, etc.). More complex arrangements can be easily envisioned by those schooled in the art, such as using a PBX or branch exchange, etc. Regardless of how the phone lines were interconnected, upon dialing, the selected carrier/network of carriers/devices would establish a "dedicated circuit" between the two end points—supposedly ensuring confidentiality of the information being communicated. This dedicated circuit is known as a "circuit switched" connection, as the connection is not "shared" with other parties while it is instantiated. Once the circuit switched interconnect was established between peer facsimile systems, the originating facsimile system would begin transmitting the rendered information to its peer.

The conceptual "copper wire" dedicated circuit theoretically would allow information to transmit only between the two endpoints attached to the circuit. Eavesdropping was viewed as an issue at the peer endpoints and potentially within the carrier networks (e.g., to meet with law enforcement requirements). However as technology has advanced and facsimile systems are no longer connected directly to a telephony networks, confidentiality of information is more suspect. Today, virtual "circuit switched" connections provided the illusion of privacy to its users. Nowadays, facsimile information may transit over different types of networks, including the Internet, which may leak both the actual rendered information and meta-data about the transmission. To complicate, as originally designed, standard facsimile services can no longer ensure the confidentiality of information alone.

In view of the circumstances and limitations of the prior art, as well as considering the migration by businesses of network resources to cloud computing environments, it would be highly desirable to provide a solution that transparently addresses the characteristics of facsimile services, further reduces the total cost of ownership of these systems, and maintains compatibility with existing fax enable applications (130, 150) and devices (140, 100) even when deployed over non-traditional telephony networks. There is a long felt need to ensure privacy of facsimile information while in transit amongst and between potentially distributed and/or geographically dispersed facsimile systems. Cost savings may be realized by virtualizing the traditional telephony network connections that interconnect facsimile systems and/or facsimile service providers.

To solve these and other problems, the Remote FAX Interconnect known as etherFAX® is a system and method that allows for the reception and delivery of information based on cloud computing infrastructure to or from one or more facsimile systems using Internet/web based communication protocols such as HTTP(S) as the transport between a facsimile capable application or hardware and the remotely accessible etherFAX® services.

Aspects of this system also provide for:

the virtualization of facsimile interconnect devices to enable remote aggregation of the physical facsimile interconnect.

the ability for reducing the overhead required for the transmission of the facsimile communications between the etherFAX® services and the fax capable application or devices.

a system for secure communication of fax information and other management and control data with the etherFAX® system.

the routing and exchange of facsimile information amongst and between a potentially distributed and/or geographically dispersed network of facsimile service providers.

the routing and exchange of facsimile information amongst and between a potentially distributed and/or geographically dispersed network of facsimile systems.

increased speed of communications between cooperating facsimile devices when compared to traditional analog facsimile transmissions.

the ability to enable traditional and/or third-party facsimile devices to take advantage of the etherFAX® service offerings through using an analog to etherFAX® (A2E) bridging adaptor.

an addressing and/or routing scheme enabling the ability to assist in the determination if a cooperating peer endpoint is authenticated and/or capable of receiving secure digital facsimile information.

extending peer endpoint addressing of traditional, existing, or third party products to access enhanced services and/or features.

Such prior systems facilitate the virtualization of facsimile hardware, the aggregation of facsimile communications hardware in a cloud-computing environment, enabling the facsimile information to traverse at least one data network providing an interconnect between at least one virtualized facsimile interface and the cloud computing environment and have the facsimile information traverse at least one telephony network interconnect between the cloud-computing environment and at least one peer facsimile system, by combining: a virtual facsimile interface loosely coupled to a data network configure to communicate facsimile information with a cloud computing environment over the data communications network; a cloud-computing environment that has interconnects to the data communications network and to at least one telephony network; the cloud computing environment also housing facsimile capable hardware that enables communications with at least one other facsimile capable system; and enabling the communications of facsimile information between the at least one virtualized facsimile interface loosely coupled to the data network and the at least one peer facsimile system loosely coupled to the telephony network through the cloud computing environment; using internet protocols to communicate the facsimile information between the cloud computing environment and the virtualized facsimile interface loosely coupled to the data network; and using the cloud computing environment to enable the transfer of the facsimile communications between the cloud computing environment and the at least one peer facsimile system.

A system and method of facilitating the virtualization of facsimile interfaces, the aggregation of facsimile communications hardware in a cloud-computing environment, enabling the facsimile information to traverse at least one data network providing an interconnect between at least one virtualized facsimile interface and the cloud computing environment and have the facsimile information traverse the at least one data network interconnect between the cloud-computing environment and at least a second virtualized facsimile interface, comprising: a first virtualized facsimile interface loosely coupled to a data network configure to communicate facsimile information with a cloud computing environment over a data communications network; at least a second virtualized facsimile interface loosely coupled to a data network configure to communicate facsimile information with a cloud computing environment over a data communications network; the cloud computing environment also housing facsimile capable hardware wherein the cloud computing environment enables communications between the at least the first and the second virtualized facsimile interfaces; and enabling the communications of facsimile information between the first virtualized facsimile interface loosely coupled to a data network and the at least second virtualized facsimile hardware loosely coupled to a data network through the cloud computing environment; using internet protocols to communicate the facsimile information between the cloud computing environment and the first virtualized facsimile interface; and using internet protocols to communicate the facsimile information between the cloud computing environment and the at least second virtualized facsimile interface.

Figure 2:
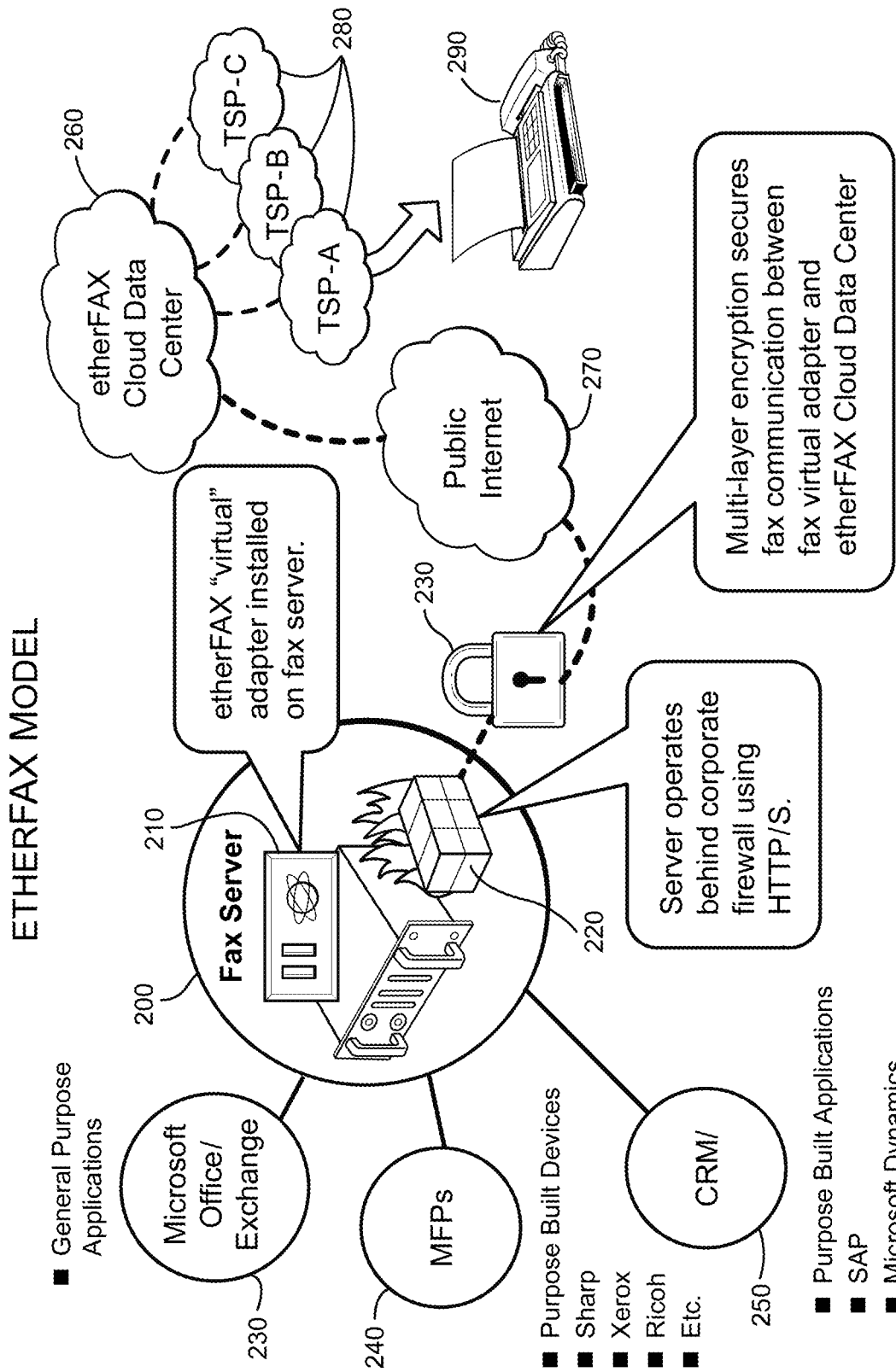

FIG. 2 of the '432 patent depicts an exemplary embodiment of the Remote FAX Interconnect system known as etherFAX®. In FIG. 1, high cost components and network access services (100, 110, 120, 160, 170) are required at each location a traditional fax server is deployed. The etherFAX® model depicted in FIG. 2 of the '432 patent allows for virtualization of the high cost components (210) to be coalesced and access to the network services (280) to be aggregated at a more centralized location (260). However, by maintaining compatibility with the communications logic at the fax server (200) general applications (230) such as email, or purpose build applications (250) and devices (240) can continue to operate without modification. Organizations can now potentially collapse their network interconnect requirements to a single network provider or infrastructure, such as the Internet, that can provides both voice and data, therefore reducing overall cost of ownership.

Due to organizational or customer requirements, there may be more than one fax server (200) installed that includes more than one virtualized etherFAX® adapter (210), either geographically or logistically dispersed by a organization for many reasons, including, but not limited to redundancy, capacity planning, and/or cost. There may be more than one etherFAX® cloud data center (260) geographically or logistically dispersed for many reason, including, but not limited to redundancy, capacity planning, and/or cost. The more than one etherFAX® cloud data center (260) may also be interconnected via a variety of data networks, whether that be direct backhauls, wireless, virtual private networks, or other methodologies that enable communications between two cooperating peers. The more than one virtualized etherFAX® adapter (210) may be so configure to allow it to communicate with the more than one etherFAX® cloud data center (260) for many reasons including, but not limited to redundancy, capacity planning, and/or cost.

The following exemplary description will enumerate the flow of information between general applications (230), purpose built applications (250) or devices (240) and the at least one facsimile peer system (290) through a single instance of fax server (200) and an etherFAX® cloud data center (260). More intricate arrangements of these components are possible depending on the application.

When applications (230) and (250), or device (240) want to send facsimile information, they continue to communicate with fax server (200) as they would. Upon reception, fax server (200) would then potentially convert the incoming information from the variety of electronic formats into the appropriate facsimile format used for subsequent transmission to at least one peer facsimile system (290). However instead of queuing the information to a locally coupled facsimile hardware, the information is passed to the virtualized etherFAX® adapter (210). The virtual adapter (210) would then instantiate the appropriate communications between itself and the etherFAX® cloud data center (260) through the organization's data network connection. The data communication could take place through many or multiple diverse paths such as over an organization's public Internet connection (270) or potentially through a direct private backhaul between the organization and the etherFAX® cloud data center (260). Additionally these communications could be secured using payload specific security, transport layer security, such as widely accepted IETF SSL/TLS standards, or passed through industry standard virtual private network (VPN) tunnel such as IPSec. Any one or more of these security methodologies may be combined to provide a layered security-in-depth approach for sensitive communications.

Once the communications is instantiated between the virtualized etherFAX® adapter (210) and the etherFAX® cloud data center (260), the facsimile information is transferred to the etherFAX® cloud data center (260) for subsequent transmission to the at least one peer facsimile system (290). Upon receipt of the facsimile information, the etherFAX® cloud data center (260) allocates the necessary resources to communicate the fax information onto its ultimate destination(s), potentially over the at least one of its telephony service providers (280). The remote facsimile communication hardware located at etherFAX® cloud data center (260), actively monitors and potentially records the progress of the communications checking page progress, connect time, remote facsimile CSID (caller subscriber id), while in transit. Upon such successful completion of the transmission to the at least one peer facsimile systems (290), a success status may be returned through the data network (230, 270) to fax server (210) signaling completion of the request. If an error condition occurs during transmission of the fax information to the at least one peer facsimile system (290), different scenarios may occur based on error status, the etherFAX® account parameters, the operations of the requesting application (230, 250), device (240), or the fax server (200). The most basic scenario is that an error status is returned back through the data network (230, 270) to fax server (210), which may then be propagated back to the originating device (240) or application (230, 250). Based on the error status returned, the application or device may then have the ability to resubmit the request to retransmit the information to the at least one peer facsimile system (290) through fax server (200).

Another alternative embodiment is for the etherFAX® cloud data center (260) to retry sending the facsimile information automatically based on account settings and/or error status. The retry logic may be different due to the circumstances of the error condition. In one scenario, if the connection to the at least one facsimile peer system (290) was established and a portion of the information was successfully transmitted, the etherFAX® cloud data center (260) may elect to begin retransmission at an intermediate portion of the information stream. This normally happens if a multipage document is submitted for transmission and only at least at one of the pages was successfully communicated. Here, the etherFAX® cloud data center (260) may elect to resume or restart the communication with the at least one peer facsimile system (290) at the beginning of the page or at the point where the error occurred. The etherFAX® cloud data center (260) may elect to resend the entire document based on account configuration parameters or error status condition (i.e., remote system out of paper, etc.).

Yet another mode exists if the at least one peer facsimile system is no longer available at its current network identifier. Here, no matter what the retransmit logic actions are, the communications will fail to the at least one facsimile peer system (290), a catastrophic error may be returned through the data network to initiating fax server (200) and ultimately the originating application (230, 250) or device (240).

Other alternative embodiments of handling successful or error status conditions may be applied without departing from the spirit of the exemplary embodiments.

Reception of facsimile information from the at least one facsimile peer system (290), through the etherFAX® cloud data center (260) to fax server (200) follows a similar but reverse path to sending facsimile information. Specifically, when the at least one facsimile peer system (290) wants to send facsimile information to fax server (200), the at least one facsimile system (290) establishes the appropriate communications connection through the at least one of the telephony service providers (280) to the etherFAX® cloud data center (260). Based on an incoming network identifier associated with the incoming fax information, the etherFAX® cloud data center (260) looks up the appropriate etherFAX® account information to determine the organization the facsimile information is destined for. There are may be a multitude of data communications paths (270) and/or security methodologies (230) employed to enable the communications of the facsimile information back to the correct virtualized etherFAX® adapter (210) coupled to fax server (200). Upon successful transmission of the facsimile information to the fax server (200) from the etherFAX® cloud data center (260), the fax server may convert the inbound information to many formats suitable for subsequent consumption by general applications (200), purpose built applications (250), and/or devices (240). Fax server (200) may queue the incoming fax information for later retrieval if the general applications (200), purpose built applications (250), and/or devices (240) are disconnected or are not communicating with the fax server (200) for any reason.

Errors may also occur during any stage of the reception process. For instance, it is possible that during communications between the at least one facsimile peer system (290) and the etherFAX® cloud data center (260), a disruption of service may occur over any of the telephony providers (280). Different scenarios may occur based on error status, the etherFAX® account parameters, or when an error occurs during transmission. Suppose that appropriate communications could not be established between the at least one facsimile system (290) and the etherFAX® cloud data center (260). This error may be handled locally by the etherFAX® cloud data center (260) as it might not have enough information to determine what etherFAX® account the inbound connection is for. However, if a partial transmission was received for a transaction, enough information may be received to allow the etherFAX® cloud data center (260) to determine the fax server (200) the communications was destined for. The error status for that operation may be propagated back to the determined fax server (200), and ultimately to the general applications (200), purpose built applications (250), and/or devices (240), enabling the corrective action to take place.

It is to be appreciated that, in both the send and receive cases, the communications between the fax server (200) and the general applications (200), purpose built applications (250), and/or devices (240), are not modified leaving the communications path and logic, and the configuration of policy and/or business rules logic of fax server (200) operations to the organization. The organization maintains internal control over distributing the facsimile information without relinquishing these services to the etherFAX® cloud data center (260).

In an alternate embodiment, there may be a multitude of fax servers (200) communicating with an etherFAX® cloud data center (260). For clarity, additional fax servers (200) were not outlined in FIG. 2. Additional advantages may be gained by adding more fax servers (200). Fax server (200) and a second fax server using the mnemonic (200*a*) belong to the same organization, but are geographically dispersed. If fax server (200) and fax server (200*a*) both availed themselves of the services of an etherFAX® cloud data center (260), the facsimile communications may never need to traverse telephony service providers (280) networks. The facsimile communications could be routed internally within an etherFAX® cloud data center (260), potentially increasing the reliability, and reducing the costs, overhead, and/or time associated with communicating facsimile information. A further benefit that may be realized is that the communication of the facsimile information could done securely between fax server (200) and the at least one additional fax server (200*a*), providing an enhanced level of service not available with traditional facsimile communications. It is also to be appreciated that the multitude of fax servers (200) may be owned and operated across organizational boundaries. In such a scenario, these enhanced levels of services would be available to the organizations associated with the etherFAX® service.

In yet another exemplary embodiment, there may be more than one etherFAX® cloud data center (260), geographically or logistically dispersed for many reasons, including, but not limited to redundancy, capacity planning, and/or cost. For clarity, additional etherFAX® cloud data centers (260) were not outlined in FIG. 2. However, additional advantages may be gained in such a configuration. Consider the example of an etherFAX® cloud data center (260) loosely coupled to an additional etherFAX® cloud data center using the mnemonic (260*a*) that are geographically dispersed. Here, etherFAX® cloud data center (260) and etherFAX® cloud data center (260*a*) may be loosely coupled to the same or different regional telephony service providers (280). When a facsimile communications is instantiated between fax server (200) and etherFAX® cloud data center (260), etherFAX® cloud data center (260) could determine based on the destination of the facsimile information to the at least one facsimile peer system (290), that it may be better to hand off the communications to etherFAX® cloud data center (260*a*), using its regional interconnects with telephony service providers (280). This could result in lower costs, as only regional tariff rates would be charged for the communications, instead of long distance charges. Other reasons also exist. If the inbound facsimile communications is marked with a high priority level of service (i.e., marked urgent), and all the local telephony resources of etherFAX® cloud data center (260) are being consumed, handing off the communications to etherFAX® cloud data center (260a) may allow the communications to be completed in a more timely manner. It is to be appreciated this functionality could be achieved in a multitude of ways, including but not limited to being handled entirely within the intercommunications between etherFAX® cloud data centers (260, 260a) or having etherFAX® cloud data center (260) redirect the fax server (200) to instantiate the appropriate communications between itself and etherFAX® cloud data center (260a).

It is also to be appreciated that other alternative embodiments and reasons for enabling intercommunications between etherFAX® cloud data center (260) and the at least one additional etherFAX® cloud data center (260a), include, but not limited to the secure communications of facsimile information or not routing the facsimile information between fax server (200) and the at least one additional fax server (200a) via telephony service providers (280), may be applied without departing from the spirit of the exemplary embodiments.

Figure 3:
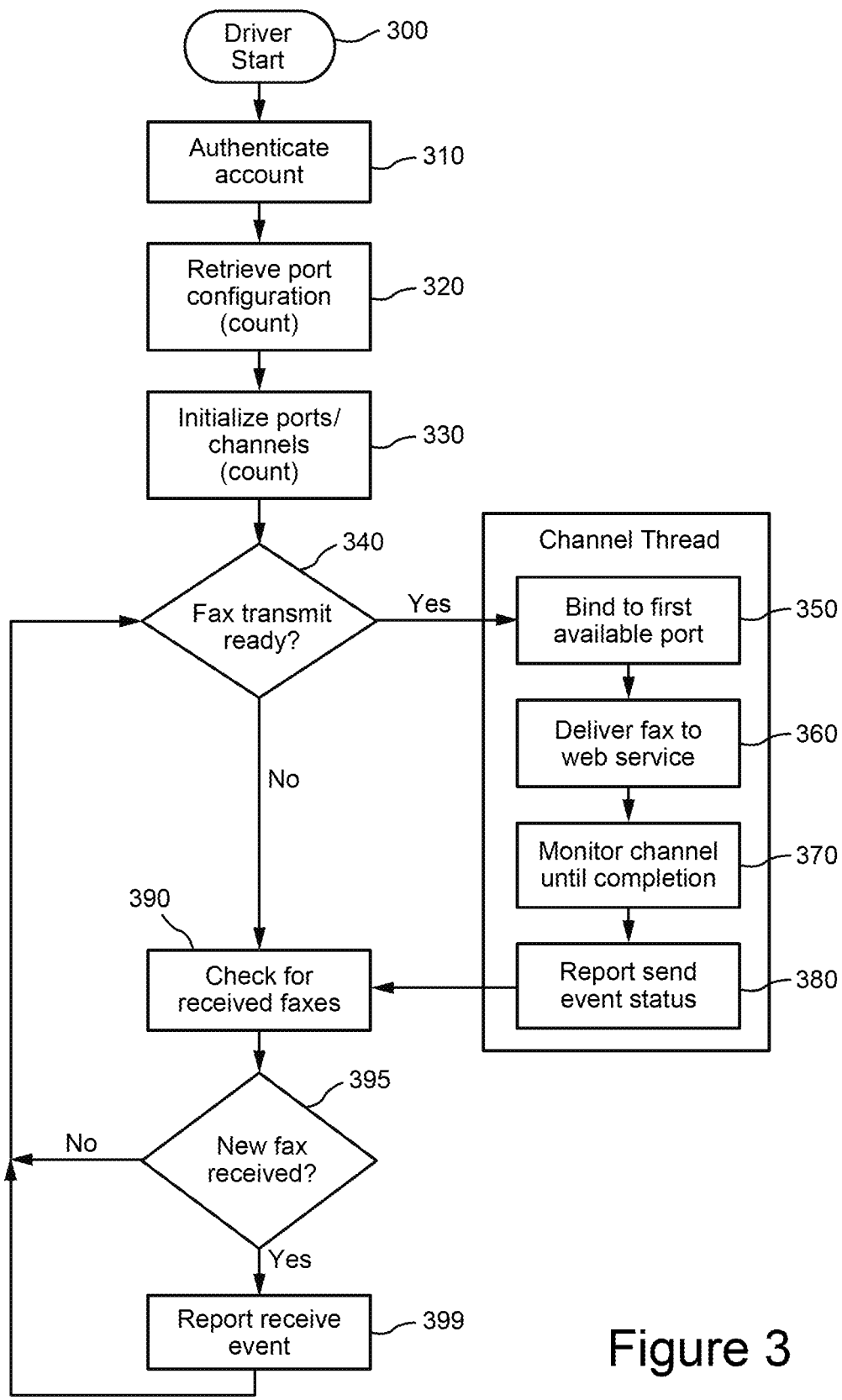

In one exemplary embodiment, the internal operations of the etherFAX® virtual fax driver (210) described in FIG. 3 of the '432 patent operates as in the following manner. At device startup time, the virtual driver startup routine (300) is executed. During startup, the driver accesses its configuration information that enables it to determine which of the at least one etherFAX® cloud data centers (260) it may establish communications to. Additional parameters, such as authentication credential information, retry logic, or other policy information such as time of operations, quality of service, priority, time offset for bulk transfers, etc., may also be accessed at this time. It may also check to see if it has the necessary access to the appropriate data channels to establish communications with the configured etherFAX® cloud data centers (260). If the configuration information is invalid, or access to the appropriate data communication channels is not operational, the etherFAX® virtual fax driver (210) may be configured to alert the system administrator there is an issue through many ways, including but not limited to email, SMS, and or system event log messaging.

If enough of the parameters pass startup self test to allow instantiation of communications with etherFAX® cloud data centers (260), the etherFAX® virtual fax driver (210) authenticates the etherFAX® account (310). The etherFAX® virtual fax driver (210) instantiates the appropriate communications with the etherFAX® cloud data centers (260), and exchanges the authentication credential information. If the credential information fails, the etherFAX® virtual fax driver (210) may be configured to alert the system administrator through the previously enumerated methods, and await further interaction with the administrator. Any outbound facsimile information transferred to fax server (200) may be queued by fax server (200), and await corrective action from the system administrator.

If authentication succeeds, the etherFAX® virtual fax driver (210) proceeds to step (320) to retrieve the number of allocated ports associated with the account. The number of ports associated with the account that are retrieved can be loosely associated with the number of concurrent telephone service provider lines that may be connected to the fax server (200). Once the port parameters are established, the etherFAX® virtual fax driver (210) proceeds to step (320) to initialize the port/channels thus allowing more than one stream of facsimile communications to occur simultaneously to accommodate the organization's work load. If initialization of the ports/channels (320) results in an error situation, the etherFAX® virtual fax driver (210) may be configured to alert the system administrator through the previously enumerated methods, and await further interaction with the administrator. Upon successful instantiation of the virtual ports/communication channels, the etherFAX® virtual fax driver (210) enters its main loop of operations. Conceptually, the main loop of operations consists of two threads of operation: one for transmission of facsimile information and the other for reception of facsimile information. It is to be appreciated that these operations can be executed either serially, in parallel, and handling more than one operation at a time based on the environment that the etherFAX® virtual fax driver (210) is implemented in and the number of virtual ports/channels assigned to the organization. In the most limited case, the main loop comprises serially checking if there is facsimile information to be transmitted to the at least one facsimile peer system (290) and if there is facsimile information to be received from the facsimile peer system (290). The precedence order of checking the status of the operation (340, 390) may be implementation specific and not consequential to the spirit of the exemplary embodiment. In a more advanced environment, each operation may happen in parallel, and the order of checking the status may happen asynchronously to one another.

In the event the checking of status indicates that work needs to be accomplished, the etherFAX® virtual fax driver (210) determines the appropriate next step of operation. If facsimile information is ready for transmission, the etherFAX® virtual driver (210) continues to step (350). At this point, the etherFAX® virtual driver (210) binds itself to the first available port (350) and delivers the facsimile information (360) to the etherFAX® cloud data center (260). The etherFAX® virtual driver (210) continues to step (370), and monitors the status of the facsimile transmittal until the termination of the request. Upon termination of the request, the etherFAX® virtual driver (210) proceeds to step (380) and checks the status of the operation. If an error occurs, the etherFAX® virtual driver (210) may take corrective action as described previously, and/or may propagate the error back to the originating application (230, 250) or device (240). Upon successful completion, the status may also be propagated back to the originating application (230, 250) or device (240).

If checking the status indicates that facsimile information is ready to be received (390), the etherFAX® virtual driver (210) proceeds to step (395) and instantiates the appropriate communications to receive the facsimile information from the etherFAX® cloud data center (260). The etherFAX® virtual driver (210) consumes the inbound facsimile information along with the status of the operations. Upon termination of the request, depending on the status of the operation, the facsimile information may be queued by the fax server (200), signaled to the intended recipient (399) via an appropriate electronic format, or in the case of an error, the status of the operation may be propagated back to application (230, 250) or device (240) for further processing.

The status of either operation may be also logged to a system event logger, and depending on the severity of the termination of the request, the status may be indicated back to the administrator through the previously enumerated methods to initiate any appropriate corrective action.

Figure 4:
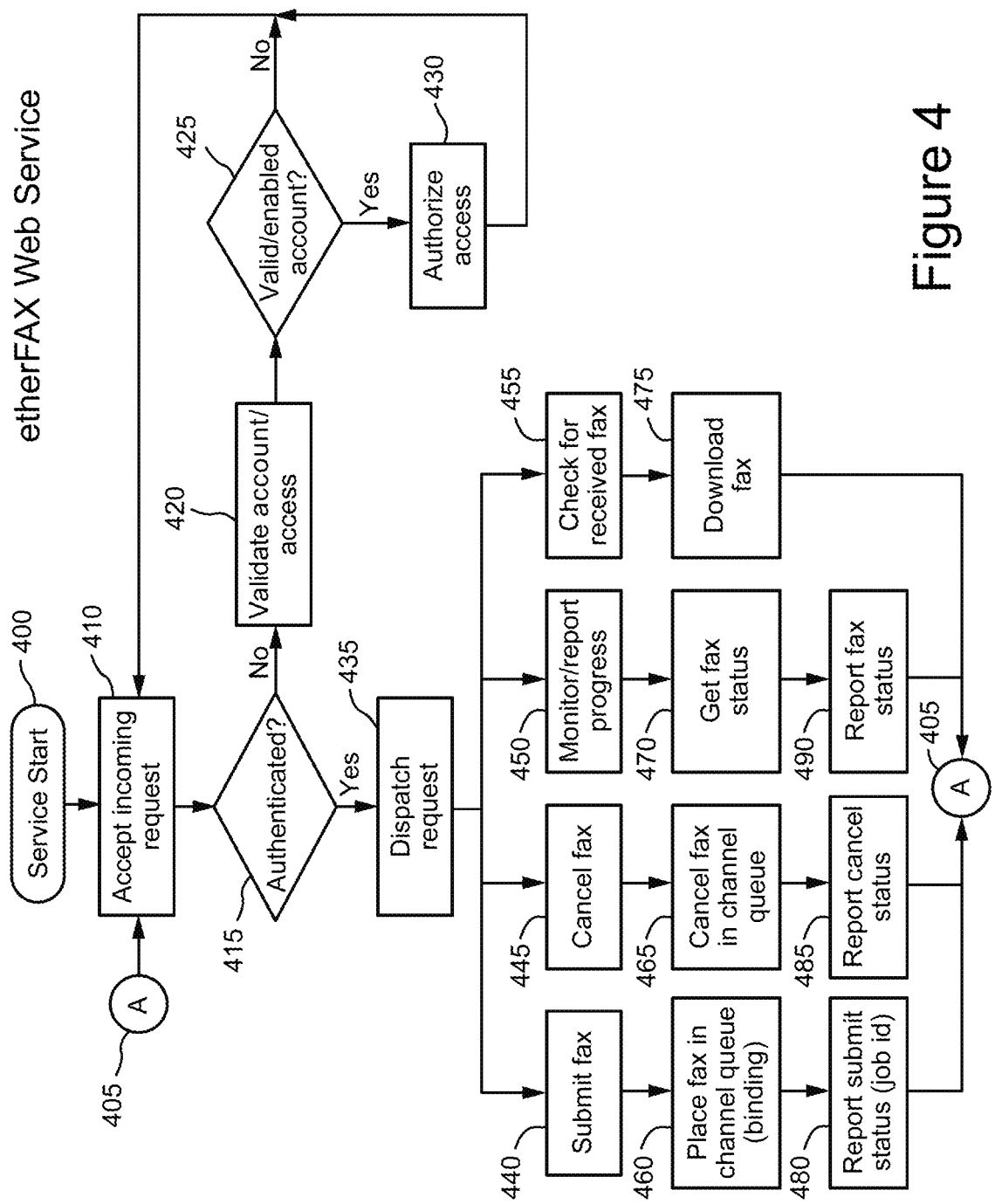

FIG. 4 (etherFAX® Web Service) of the '432 patent illustrates the service interface exposed over the at least one data network interconnect to at least one etherFAX® cloud data center (260). At startup of the service (400), the etherFAX® Web Service initializes itself to enable the acceptance of inbound communications from the at least one fax server (200). Once all resources are allocated (HTTP(S) listeners, etc.), the etherFAX® Web Service proceeds to step (410) and awaits inbound connections at step (405). Upon indications of an inbound facsimile communications, the etherFAX® Web Service proceeds to step (410) to accept incoming connections. Once the inbound communications is instantiated, etherFAX® Web Service proceeds step (415) to determine if the connection was previously authenticated. It is to be appreciated there are many alternative methods of (re)instantiating communications between fax server (200) and the etherFAX® cloud data center (260). In one embodiment, persistent HTTP(S) connections may be instantiated enabling the authentication process to happen periodically and only when the connection times out, allowing the etherFAX® Web Service to proceeds to step (415). However, authentication may happen on each instantiation of communications between fax server (200) and the etherFAX® cloud data center (260) depending on the communications methodology used. If the connection is not authenticated, the etherFAX® Web Service process proceeds to step (420) to validate the incoming authentication credentials. At step (425), the etherFAX® Web Service authenticates the credentials against the etherFAX® account information. If there is an error authenticating the inbound communications session, an error is returned to the initiating party, and the etherFAX® Web Service returns to step (410) and awaits further inbound requests.

If the authentication process succeeds, the etherFAX® Web Service continues to step (435) to dispatch the inbound request. The request can be one of several different operations either related to the communications of facsimile information or command, control, or status of the etherFAX® account. For clarity, FIG. 4 has only illustrated the high level operations of submitting facsimile information (440), canceling a facsimile operation (445), monitor/reports progress of a facsimile operation (450), and/or checking for received/inbound facsimile information (455). Other operations such checking the etherFAX® account balance, determining number of faxes transmitted and received, changing account credentials, etc., can also be accessed through the etherFAX® Web Service interface. Web services is only one exemplary embodiment of a protocol used to enable distributed processing between cooperating peer computing systems. Other remote procedure call technologies can also accomplish similar results.

In the exemplary embodiment, the requested operation can be thought of as a job object, transaction, or work request. To submit facsimile information for subsequent transmittal work request (440), the etherFAX® Web Service process proceeds to step (460) and passes the submitted work request to the etherFAX® Board server process illustrated in FIG. 5. The etherFAX® Web Service process then proceeds to step (480) and returns that status of the submit work request to the calling peer. The process then returns to step (405) and awaits additional incoming work requests.

Similarly, if the requested operation is to cancel (445) a previously submitted fax work request, the etherFAX® Web Service dispatcher continues to step (465) and contacts the etherFAX® Board server process to cancel a previously submitted work request. If previously submitted facsimile work request is pending or in progress, the etherFAX® Board server will try to terminate the work request depending at what stage of communications it is in with the at least one peer facsimile system (290). If the transaction has already be completed before the cancel work request is recognized by the etherFAX® Board server process, the cancel operation will fail. In either case, the appropriate status will be returned (490) to the calling peer, indicating the status of the transaction of interest and the status operation itself. The process then returns to step (405) and awaits additional incoming work requests.

A consumer of the etherFAX® Web Service may also want to monitor (450) the progress of a previously submitted or the current operation of a transaction in progress. In these cases, the etherFAX® Web Service dispatcher continues to step (470) and contacts the etherFAX® Board server process to get the current status of the specific work request. Once the status is received, the etherFAX® Web Service process proceeds to step (490) and returns the appropriate status information based on the type work request of interest.

To receive facsimile information from the one etherFAX® cloud data center (260), the calling peer contacts the etherFAX® Web Service to check for inbound (455) facsimile communications. If any inbound facsimile information waits, the etherFAX® Web Service process proceeds to step (475) to transfer the information from the etherFAX® Web Service to the calling peer. The transferred information also contains ancillary information associated with the facsimile data, including but not limited to the originating phone number (if available), network identifier, length, and/or error/success status. After the transfer is completed, the etherFAX® Web Service process returns to step (405) waiting for additional work requests.

The precedence order of dispatching the requested operation (440, 445, 450, 455) may be implementation specific. In a more advanced environment, each operation may happen in parallel, and the order of operation may happen asynchronously to one another.

Figure 5:
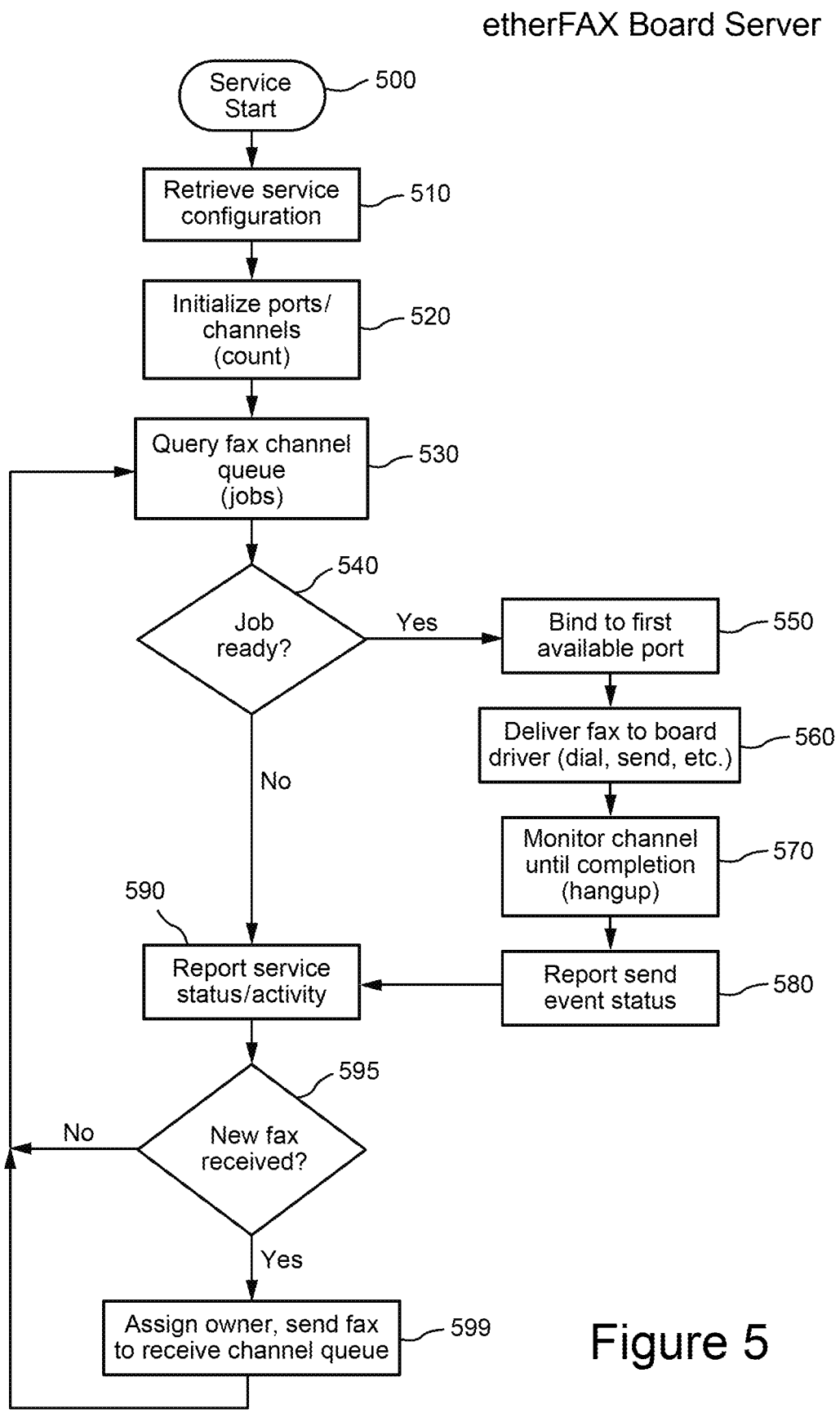

FIG. 5 (etherFAX® Board Server) of the '432 patent illustrates the service interface exposed to send and accept facsimile information via telephony service providers (280) from the at least one facsimile peer system (290). FIG. 5 of the '432 patent also illustrates the exposed interface for exchanging work requests with the etherFAX® Web Service process. At startup of the service (500), the etherFAX® Board Server process initializes itself and proceeds to step (510) to retrieve its service configuration information. If there is any error in the configuration information that prevents the etherFAX® Board Server process from proceeding, it logs a message and exits, awaiting correct action from the administrator.

Upon acceptance of the configuration information, the etherFAX® Board Server process continues to step (520) and initializes the facsimile communications hardware that enables sending and receiving facsimile information from the at least one facsimile peer system (290) via telephony service providers (280). The facsimile communications hardware may be capable of handling communications with more than one facsimile peer system (290) simultaneously. Each concurrent communications stream that can be handled can be considered a separate port or channel. If an error occurs during the initialization phase of the hardware, the etherFAX® Board Server process logs a message for the administrator. Depending on the severity of the error condition, the etherFAX® Board Server process may also exit and await corrective action before it can be restarted.

Once the etherFAX® Board Server process has initialized the facsimile hardware under its control, it enters its main loop at step (530). At this point, the etherFAX® Board Server process is waiting to receive work requests from the etherFAX® Web Service process or receive indications from the facsimile hardware. Once a work request is passed to the etherFAX® Board Server process, it validates whether or not the transaction is ready to be processed at step (540). If not, it returns to step (530) awaiting a valid request. If the work request is ready and it is to send facsimile information to the at least one facsimile peer system, the etherFAX® Board Server process proceeds to step (550). At this point, the etherFAX® Board Server process binds to the most appropriate channel to use to send the facsimile information over. It then delivers the facsimile information to the facsimile hardware, along with other necessary information, such as but not limited to, phone number or network identifier of the at least one peer facsimile system, color or black and white, caller subscriber identifier, etc., that are used to establish the appropriate communications with the peer system.

In an embodiment of the etherFAX® Board server process, due to the aggregation of facsimile hardware and the interconnection with the at least one telephony service provided (280) during transmittal of the facsimile information, the etherFAX® Board server process will try to configure the origination network identifier or phone number to be consistent with the originating organizations information for caller ID purposes. It also takes care to maintain that the caller subscriber identifier (CSID) is included as part of the outbound facsimile information.

Once this information is passed to the facsimile hardware, it instantiates the communications with the at least one peer facsimile system (290). During this time, the etherFAX® Board Server process proceeds to step (570) and monitors the status of the operation. If the operation successfully completes the transfer of the facsimile information to the at least one peer facsimile system (290), the etherFAX® Board Server process continues to step (580) and logs an audit message tracking the status of the send transaction. At step (590), the etherFAX® Board Server process completes the work request and allows the etherFAX® Web service process to query its successful status.

A multitude of error can also occur, including but not limited to, no answer, busy, peer unavailable due to no paper, out of ink/toner, etc. Other communication errors could occur where communications is terminated during the middle of the transfer. Depending on the severity of the error, etherFAX® account configuration, etc., corrective actions that where enumerated previously may be executed locally by the etherFAX® Board Server process. Other error status may have to be handled by the originating peer. In either case, upon determination by the etherFAX® Board Server that the process has finished handling the specific transaction, it proceeds to step (580) and logs a message for the administrator. The work request is then completed at (590) allowing the etherFAX® Web service process to query its status. At this point the etherFAX® Board Server process may check if any inbound facsimile information is to be received. If not, the etherFAX® Board Server process returns to step (530) and waits for further work to do.

If an inbound facsimile information is received, the etherFAX® Board Server process proceeds to step (595) to check the status of the inbound communications. If the facsimile information is ready to be consumed, the etherFAX® Board Server process looks up the associated etherFAX® account the incoming facsimile information is destined for. It then assigns an owner and a channel to the communications allowing the inbound facsimile information to be received. Once the facsimile information is successfully received, the etherFAX® Board Server process logs an audit message and completes the transaction allowing the etherFAX® Web Service process to query the state of the received facsimile information.

A multitude of errors can also occur, including but not limited to, no channels available, no account, account suspended, etc. Other communication errors could occur where communications is terminated during the middle of the transfer. Depending on the severity of the error, etherFAX® account configuration, etc., corrective action may be executed locally by the etherFAX® Board Server process. Other error status may have to be handled by the originating peer facsimile system (290). In either case, upon determination by the etherFAX® Board Server process it has finished handling the specific receive operation, it logs a message for the administrator. The job is then completed at (599) allowing the etherFAX® Web service process to query its status. At this point, the etherFAX® Board Server process returns to step (530) and waits for further work to do.

It is to be understood that the precedence order of checking the status of the operation (540, 595) may be implementation specific. In a more advanced environment, each operation may happen in parallel, and the order of checking the status may happen asynchronously to one another.

It is to be understood that within an etherFAX® cloud data center (260), there may be more than one etherFAX® Web Service process running enabling the system to process more than one request at a time. The processes can be deployed as separate threads in a single computer process, multiple instances of the processes on a single computer system, or across multiple computer systems, whether they are operating in a virtual machine environment or not.

Furthermore it is to be understood that within an etherFAX® cloud data center (260), there may be more than one etherFAX® Board Server process running enabling the system to process more than one request at a time. The processes can be deployed as separate threads in a single computer process, multiple instances of the processes on a single computer system, or across multiple computer systems, whether they be operating in a virtual machine environment or not.

The etherFAX® Web Service and etherFAX® Board Server may be running on different computer systems, whether they are operating in a virtual machine environment or not as the interface between the services may be accomplish thorough a web service interface or other suitable remote procedure call mechanism. The different computer systems housing each server may be geographically or logistically dispersed for many reasons, including but not limited to redundancy, capacity, and/or cost.

Example Non-Limiting Security Improvements

While the above-described architecture has succeeded in its own right, further improvements are possible and desirable.

As example security considerations discussed above, confidentiality and security of facsimile information is often of paramount importance. However, using standard facsimile protocols and establishing connections over standard telephony circuit switch carrier interconnects are often less than optimal for security and confidentiality purposes. Traditional telephony technology provides only the illusion of confidentiality between peer facsimile systems. Prior art systems dial the at least one direct inward dial (DID) destination phone number or network identifier of the peer facsimile system, with the tacit assumption that the intended recipient is on the receiving end (at the specified number/id). There is no way to verify that the peer system is that of the intended recipient, or that more than one system is not listening in on the transmittal of the information. Today many telephony carriers use alternative network interconnects, such as the Internet, within and between carriers, to transport traditional circuit switch traffic, potentially leaving facsimile information exposed to nefarious individuals who could eavesdrop/intercept the information anywhere along the route.

To help resolve these issues, in one non-limiting exemplary embodiment, the etherFAX® architecture provides for the capability of multiple geographically or logistically dispersed service centers, allowing for the localization of connections close to the point of presence of the peer end facsimile systems. Installing at least one etherFAX® service center within or connected to a local exchange carrier's (LEC) telephony network serving at least one peer facsimile system, enables etherFAX® to minimize the exposure of the communiqué potentially to the last hop of the network interconnects with the at least one peer facsimile system. Routing logic within the etherFAX® system will transfer the communications to the appropriate etherFAX® service center associated with the LEC or other type of serving telephony provider. Other arrangements are possible regarding the establishment of a confidential connection with a peer facsimile system. The selected service center will then transmit the communiqué to the specified phone number and/or network identifier.

The etherFAX® architecture also enables the ability to better verify the at least one recipient peer facsimile system is an intended recipient of a communiqué, using a two-phase authentication process. Prior to transmitting a confidential communiqué, the etherFAX® cloud data center can send an authorization message that contains an authorization code. This authorization code could be randomly chosen, unique to the document, a hash based on information of the recipient such as name, address, other information about the recipient, etc. Other permutations of deriving an authorization code are possible. The authorization code can be transmitted to the at least one intended recipient, to their peer facsimile system or through alternate channels such as a short message service (SMS), other short messaging services like etherSMS®, Twitter, WhatsApp, email, voice telephony communications, authentication services such as Google Authenticator, a purpose built etherFAX® computer application, or other out-of-band methodology, potentially based on policy and information provided by the originator and/or the at least one intended recipient.

In one illustrative embodiment, upon receipt of the authorization code, the at least one intended recipient of the information would then connect to the etherFAX® cloud data center through a portal provided via a web application or service, a purpose built etherFAX® application that runs on handle devices, smartphones or on more traditional computer or facsimile systems (desktops, fax servers, purpose built devices, etc.), to enter in the authorization code received, potentially with other information associated with the peer facsimile endpoint such as the direct inward dialing (DID) number (phone number), other network identifier of the at least one intended peer recipients facsimile system, additional information received via at least one alternate channel, etc. Once the information entered has been verified, the etherFAX® data center can be reasonably sure that the peer facsimile system is the intended recipient of the original communiqué. The serving etherFAX® service center can then forward the original communiqué with more confidence that the information is reaching the at least one intended recipient's peer facsimile system verified. Based on policy or other requirements, in a non-limiting illustrative embodiment, the authorization process may be conducted on each communiqué, or it can be a one-time event. In another non-limiting illustrative embodiment, the etherFAX® data service center can cache a list of verified network identifiers for the at least one intended recipient facsimile system. This list can be checked prior to transmission of the communiqué. If the network identifier and/or phone number for the at least one intended recipient is in the list, based on policy or other requirements, the etherFAX® data center can transmit a communiqué to the already verified identifier of the at least one intended recipient facsimile system. In one exemplary embodiment, the cached list can be time limited, potentially requiring the authorization process to reoccur after some specified period of time (e.g., once a day, once a month, once a year, etc.).

Conversely, if the identifier is not in the cache, or the authorization process fails in one exemplary embodiment, potentially based on policy or other requirements, the serving etherFAX® data service center can return an error back to the originating etherFAX® virtualized adapter. The error condition may then be propagated to the originating application, purpose built device or application for corrective action. In one instance, this could simply be because an originating user may have entered in the phone number and/or a network identifier incorrectly and organizational policy requires that all identifiers of peer facsimile systems be verified/authorized before forwarding a given communiqué.

However, installing etherFAX® service centers in all local exchange carriers networks or telephony service providers around the global is an ambitious effort even under the best circumstances. To better resolve this issues outline, in another non-limiting illustrative embodiment, a communiqué from one etherFAX® user to another, whether that be intra or inter organizational, might remain confidential in transit along the route within the etherFAX® ecosystem. To further ensure the confidentiality of facsimile transmissions, in one embodiment, the etherFAX® architecture enables the ability to federate multiple facsimile service providers that may use technology other than etherFAX® virtual adapters, over trusted network interconnects, potentially negating the transmission over insecure telephony networks entirely.

Figure 6:
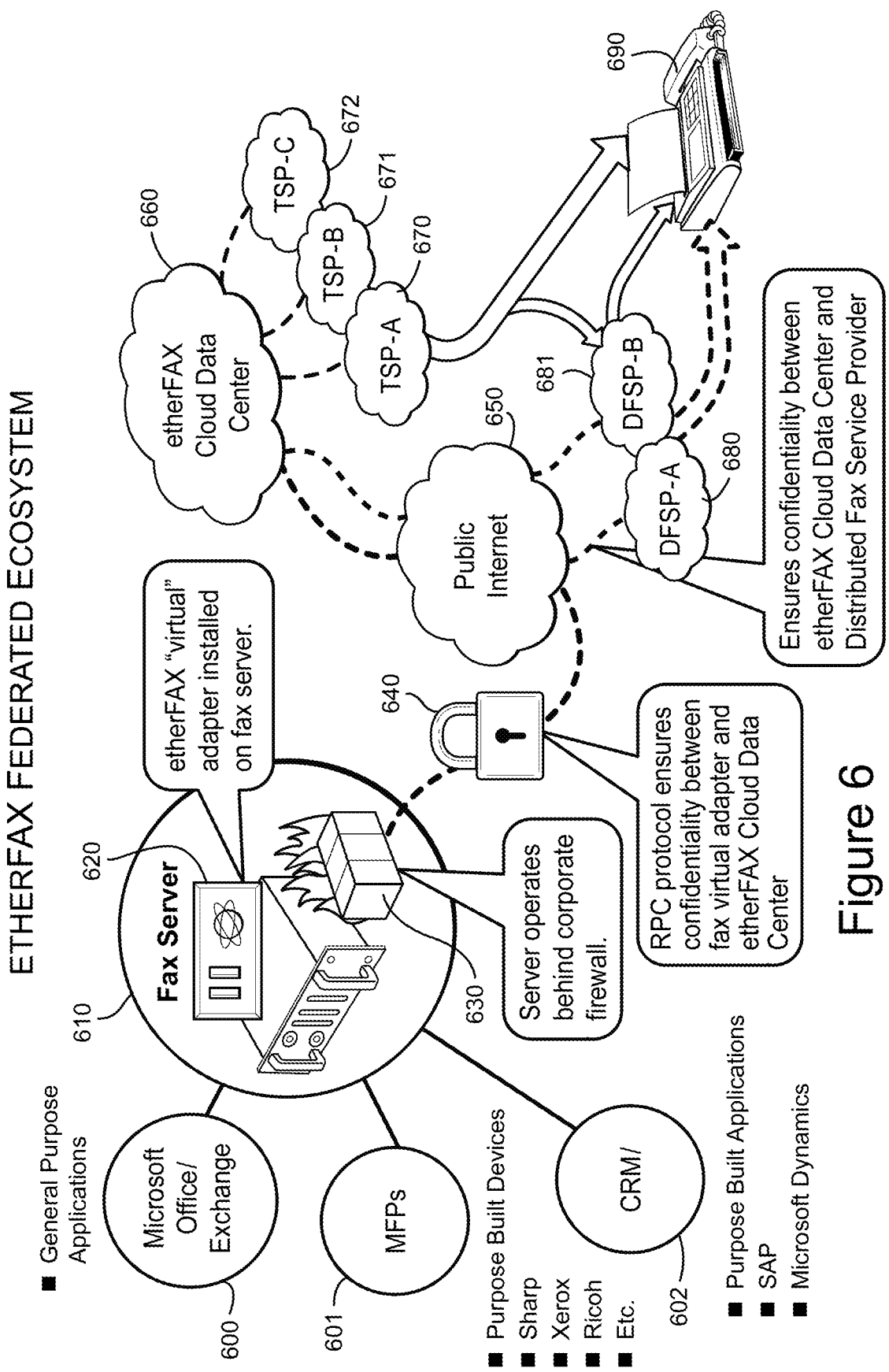
FIG. 6 is a schematic diagram depicting an example interconnect for the routing and exchange of facsimile information amongst and between at least one potentially dispersed and/or geographically distributed facsimile service providers (DFSP).

Certain example non-limiting embodiments of the technology and their advantages may be understood by referring to FIG. 6 and following, wherein like reference numerals refer to like elements, and are describe in the context of a facsimile system. For clarity, "non-cooperating peer facsimile capable system" is defined as "a system that communicates with at least one other facsimile capable device using traditional facsimile techniques and methods." The technology applies to alternative embodiments and alternate communication technologies such as described in, but not limited to, Internet RFC 4160 (Internet Fax Gateway Requirements and its siblings) or other Fax over IP methodologies, that enable communications between facsimile enabled applications or devices.

FIG. 6 is an illustrative representation of the etherFAX® ecosystem interconnecting with at least one other peer distributed facsimile service provider (DFSP) securely. In the illustrative non-limiting embodiment, the etherFAX® architecture virtualizes the telephony service providers (670, 671, 672, etc.). By virtualizing the telephony service provider interface, the etherFAX® Data Center can circumvent the outward dialing and/or inward answering steps, with the use of traditional analog/modem signaling to establish communications with the at least one intended recipient of the communiqué, especially if the network identifier/phone number of the recipient is associated with another facsimile service provider. Virtualizing the telephony service provider interface and/or the traditional analog/modem signaling provides a significant advantage for potentially reducing the transmission time necessary for a communiqué, which may approach near-real time. In one illustrative embodiment, enhanced attributes such as document format (TIFF, PDF, etc.) and policy about the transmission such as requiring encryption, a time to live, recall, etc. can also be established, negotiated, and/or communicated prior to or in concert with the transmission of the communiqué.

In the exemplary non-limiting diagram of FIG. 6, DFSP-A & DFPS-B (680, 681) are connected to the public Internet (650) that the etherFAX® cloud data center (660) has access to. Alternative network interconnect methodologies and configurations between the etherFAX® cloud data center (660) and the at least one DFSP (680, 681) are possible. By federating services across at least one other distributed facsimile service provider organization, confidentiality of communiqués can be ensured across network interconnects for customers serviced by a provider.

At a high level and as depicted in FIG. 6, in one illustrative non-limiting embodiment, a facsimile communications may originate by an application (600, 602) or purpose built device (601). The facsimile information is to be forwarded by an organization to a serving etherFAX® service center (660). In one exemplary embodiment, once an organization's policy has been applied (if any) to the communiqué and it is ready to be sent, an organization's fax server (610) contacts the etherFAX® cloud data center (660) through its virtualized adapter (620). The virtualized adapter (620) establishes a secure connection via an encrypted remote procedure call protocol such as HTTPS ensuring the confidentiality of the facsimile document itself and metadata associated with any intended recipients of the communiqué to the etherFAX® data service center. Other layers of security may also be instantiated such as a virtual private network over the network interconnect that aids in following a security-in-depth methodology. Upon reception of the document, image, etc., in the non-limiting exemplary embodiment, the etherFAX® cloud data center (660) processes the request and initiates the routing of the transmission to its intended recipient. Based on the identifier, account information, and/or policy of the originating organization and/or the at least one intended recipient of the communiqué, the etherFAX® cloud data center (660) may instantiate a connection over the at least one telephony service provider (670, 671, 672). However, in an illustrative embodiment, the at least one etherFAX® cloud data center is also configured to communicate with at least one peer distributed facsimile service provider (680, 681) other than a standard telephone interconnect 670, 671, 672. If the etherFAX® cloud data center (660) determines that the at least one DSFP (680, 681) is an intended next hop for the at least one recipient of the communiqué, the etherFAX® cloud data center can circumvent the communications over the potentially insecure telephony service provider (670, 671, 672) interconnect. In lieu of this connection, the etherFAX® cloud data center (660) can establish a secure communications link to the at least one peer DSFP system (680, 681) through the public Internet (650) or other data network interconnect.

The secure connection between the etherFAX® cloud data center (660) and the DSFP (680, 681) may be a persistent link and not established for each exchange. Over this secure communications link, the serving etherFAX® service center will transfer the communiqué to the federated DSFP (680, 681) that is associated with the at least one intended recipient. Depending on the requirements of the originating and/or intended recipient organization and the capabilities of the peer DFSP (680, 681), transmission of the facsimile information may or may not then travel over a telephony service provider interconnect that is associated with the selected trusted DFSP (not shown) or over a secured communications link to the intended recipients facsimile system (690), further reducing exposure and helping to ensure the confidentiality of the information across the transmission path. This exemplary, non-limiting embodiment also may reduce the cost of the communiqué to the parties, as any tariffs associated with the at least one telephony service provider may be circumvented. Communiqués in the reverse direction can travel a similar reverse path as the etherFAX® cloud data center (660) can act as a peer distributed facsimile service provider for other federated DFSPs.

Figure 7:
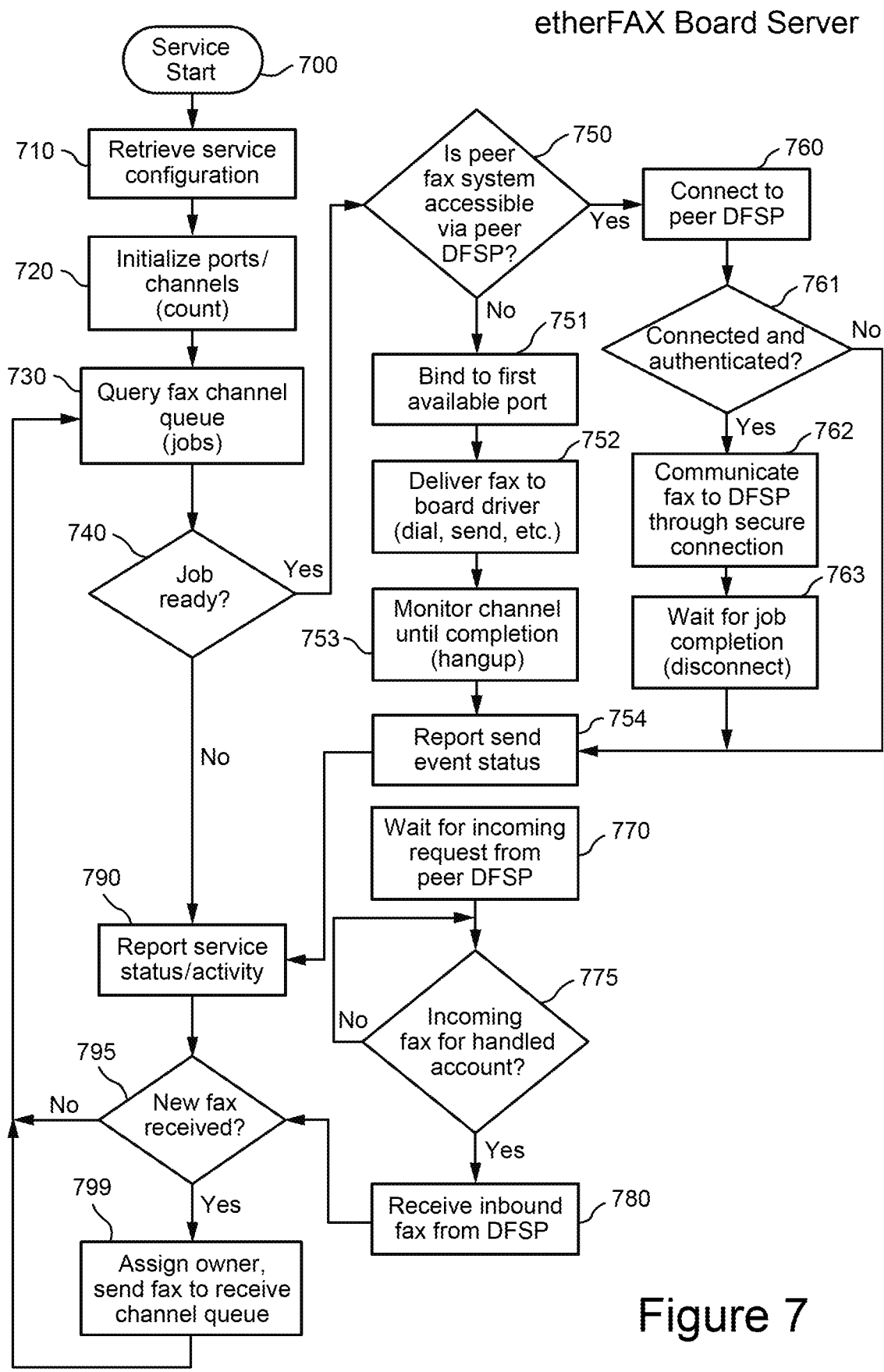
FIG. 7 is a schematic diagram depicting an example etherFAX® system communicating with at least one peer distributed facsimile service provider (DFSP).

FIG. 7 represents a non-limiting exemplary high-level schematic block diagram of the board server logic augmented to communicate with traditional telephony network service providers and/or distributed facsimile service providers.

In an exemplary embodiment, FIG. 6 & FIG. 7 (etherFAX® Board Server) illustrates an exposed service interface that has been augmented to send and accept facsimile information via telephony service providers (670, 671, 672) and/or distributed facsimile service providers (680, 681) from the at least one facsimile peer system (690). It also illustrates the exposed interface for exchanging work requests with the etherFAX® Web Service process. At startup of the service (700), the etherFAX® Board Server process initializes itself and proceeds to step (710) to retrieve its service configuration information. If there is any error in the configuration information that prevents the etherFAX® Board Server process from proceeding, it logs a message and exits, awaiting corrective action from the administrator.

Upon acceptance of the configuration information, the etherFAX® Board Server process continues to step (720) and initializes any facsimile communications hardware that enables sending and receiving facsimile information from the at least one facsimile peer system (690) via TSPs (670, 671, 672) and/or DFSPs (680, 681). The Board service interface may be capable of handling communications with more than one facsimile peer system (690) or DFSP (680, 681) simultaneously. Each concurrent communications stream that can be handled can be considered a separate port/channel/connection. If an error occurs during the initialization phase, the etherFAX® Board Server process logs a message for the administrator. Depending on the severity of the error condition, the etherFAX® Board Server process may also exit and await corrective action before it can be restarted.

Once the etherFAX® Board Server process has initialized, it enters its main loop at step (730). At this point the etherFAX® Board Server process is waiting to receive work requests from the etherFAX® Web Service process or receive indications from the facsimile hardware or peer DFSPs. Once a work request is passed to the etherFAX® Board Server process, it validates whether or not the transaction is ready to be processed at step (740). If not, it returns to step (730) awaiting a valid request. If the work request is ready and it is to send facsimile information to the at least one facsimile peer system, the etherFAX® Board Server process proceeds to step (750). At this point the etherFAX® Board Server checks to see if the recipient facsimile (690) system can be accessed through the at least one distributed facsimile service providers. This might be accomplished by generating a query to the at least one DFSP with the phone number and/or network identifier of the peer recipient system (690). A list of handled peer system identifiers that may have be previously provided and populated by the at least one DFSPs can be checked to determine whether or not to communicate to a particular DFSP in lieu of using a telephony service provider. Depending on whether the at least one peer facsimile system (690) is accessible via the at least one DFSP (680, 681), the system continues to either step (751) or step (760). If the board service determines that the at least one peer facsimile system (690) is not accessible via the at least DFSP (680, 681), it proceeds to bind to the most appropriate channel to use to send the facsimile information over (751). It then delivers the facsimile information to the facsimile driver (752), with other necessary information, such as but not limited to, phone number or network identifier of the at least one peer facsimile system, color or black and white, caller subscriber identifier, etc., that are used to establish the communications with the peer system.

In an embodiment of the etherFAX® Board server process, due to the aggregation of facsimile hardware and the interconnection with the at least one telephony service provided (670, 671, 672) during transmittal of the facsimile information, the etherFAX® Board server process will try to configure the origination network identifier or phone number to be consistent with the originating organizations information for caller ID purposes. It also takes care to maintain that the caller subscriber identifier (CSID) is included as part of the outbound facsimile information.

Once this information is passed to the facsimile hardware, it instantiates the necessary communications with the at least one peer facsimile system (690). The etherFAX® Board Server process proceeds to step (753) and monitors the status of the operation. If the operation successfully completes the transfer of the facsimile information to the at least one peer facsimile system (690), the etherFAX® Board Server process continues to step (754) and logs an audit message tracking the status of the send transaction. At step (790), the etherFAX® Board Server process completes the work request and allows the etherFAX® Web service process to query its successful status.

If it was determined at step (750) that the at least one peer facsimile system was accessible via the at least one DFSP (680, 681), the service interface establishes a secure communications link to the at least one DFSP (680, 681). This can be accomplished in several ways already indicated. In the way of a non-limiting example, methodologies include virtual private networking, using transport layer security protocols such as IETF standard SSL/TLS, private networking interconnects between the service providers, or a combination thereof to provide a security-in-depth capability. Once the secure communication link has been established and potentially authenticated (761), the service interface transfers the facsimile information along with any necessary and/or pertinent meta-data about the transmission enumerated above. A transaction ID may be included as part of the information, for audit and status purposes.

Once this facsimile and ancillary data has been communicated to the at least one DFSP (680, 681), the service interface proceeds to step (763) awaiting job completion. Once status about the job has completed and status has been returned, the service interface transitions to step (754) and proceeds through the next phases of the operation in similar fashion as if the communications had occurred over the at least one telephony service providers (670, 671, 672).

To process inbound facsimile information from the at least one DFSP (680, 681), the service interface is augmented with an additional listening step waiting for incoming requests from a peer to the at least one DFSP (680, 681). The service interface listens for incoming requests at step (770). In a non-limiting illustrative embodiment, one type of request may determine if an at least one peer facsimile system is serviced by the etherFAX® cloud service center (660). If the at least one peer facsimile system is attached to an account handled by the service center (660), a positive response may be returned to the at least one querying DFSP (680, 681). At that point the at least one contacting DFSP would then communicate the facsimile information and any ancillary data associated with the request (775). If an error occurred, status may be recorded and/or returned to the at least one contacting DFSP and the job is terminated within the service interface returning the interface to step (770). Upon a successful reception of the information, the service interface proceeds to step (795) and continues with any additional processing necessary to handle the completed inbound facsimile communiqué.

For brevity and clarity, the steps are being listed serially and/or in synchronous order. However many steps outlined can be completed asynchronously to allow more efficient processing. For instance, after communicating the facsimile job to an at least one DFSP, the service interface may opt to proceed to step (730) or step (790) instead of waiting at step (763) for the disposition of the request and potential disconnect. Subsequently, the at least one DFSP could asynchronously establish a communications link back to the service interface indicating the status of the at least one request. In one non-limiting exemplary embodiment, using the transaction ID, the cooperating peer facsimile service provider systems can match up actions and statuses associated with a request.

A multitude of errors can also occur, including but not limited to, no answer, busy, peer unavailable due to no paper, out of ink/toner, etc. Other communication errors could occur where communications is terminated during the middle of the transfer. Depending on the severity of the error, etherFAX® account configuration, etc., corrective action other than or besides that enumerated previously may be executed locally by the etherFAX® Board Server process. Other error status may have to be handled by the originating peer. In either case, upon determination by the etherFAX® Board Server that the process has finished handling a specific transaction, it proceeds to either step (754) or (790) and records the status of the operation. The work request is then completed at (790), allowing the etherFAX® Web service process to query its status. At this point the etherFAX® Board Server process may check for inbound facsimile information. If not, the etherFAX® Board Server process returns to step (730) and waits for further work to do.

If an inbound facsimile information is received, either via the at least one telephony service providers (670, 671, 672) or the at least one DFSP (680, 681), the etherFAX® Board Server process proceeds to step (795) which checks the status of the inbound communications. If the facsimile information is ready to be consumed, the etherFAX® Board Server process looks up the associated etherFAX® account the incoming facsimile information is destined for. Regardless of which interconnection the incoming request is received over (670, 671, 672, 680, 681), it assigns the necessary resources allowing the inbound facsimile information to be received. Once the facsimile information is successfully received, the etherFAX® Board Server process logs an audit message, potentially returns status information to the originating peer, and completes the transaction allowing the etherFAX® Web Service process to query the state of the received facsimile information.

A multitude of errors can also occur, including but not limited to, no channels available, no account, account suspended, etc. Other communication errors could occur where communications is terminated during the middle of the transfer. Depending on the severity of the error, etherFAX® account configuration, etc., corrective action may be executed locally by the etherFAX® Board Server process. Other error status may have to be handled by the originating peer facsimile system (690). In either case, upon determination by the etherFAX® Board Server process that it has finished handling the specific receive operation, it logs a message for the administrator. The job is then completed at (799) allowing the etherFAX® Web service process to query its status. At this point, the etherFAX® Board Server process returns to step (730) and waits for further work to do.

The precedence order of checking the status of the operation (740, 795) may be implementation specific. In a more advanced or different environment, each operation may happen in parallel, and the order of checking the status may happen asynchronously to one another.

The actual steps of determining that a communiqué is destined for, being received from, and/or communicating with and/or processing information from the at least one DFSP (680, 681) may occur at a previous or multiple stages of the etherFAX® architecture to best optimize the processing of a request. For instance, in one non-limiting embodiment, the determining step may occur prior to the submission to the board service interface as presented in FIG. 7. This previous step may then exchange work requests with a service interface that is dedicated to communicate with the at least one DFSP (680, 681) and may run partially or entirely in a separate process from the board server process or with another process entirely.

In yet another non-limiting illustrative embodiment, the etherFAX® ecosystem allows for a different arrangement to enable communications amongst and between DFSPs. While the non-limiting exemplary embodiment of FIG. 6 represents a more peer-to-peer relationship between the at least one other DFPS, some properties of that arrangement may not be appropriate depending on relationships between the federated DFSPs or business requirements of the DFPS organization or customers. For instance, the step to determine which of the at least one other DFSP to forward a communiqué to may require a priori knowledge shared between peer DFSP, or potentially an active query between the peers. If over two DFSPs are federated, this could require multiple queries or checking multiple lists.

This sharing of information may lead to business issues, as each federated peer may garner customer relationship information from their "competition". Traditionally, a DID/phone number over a telephony network provides little information about the recipient, other than the intended recipient is using the services of the telephony organization that the phone number/DID is assigned to. However, sharing this information between each of the Distributed Facsimile Service Providers, potentially enables each of the peers to mine the meta-data about the communiqué to determine which particular entities are associated with the at least one federated providers. While it could be assumed and contractually binding that all peers participating have altruistic goals and agree not to poach each other's customers, this business intelligence could be used for other nefarious purposes if the information falls into the wrong hands.

To alleviate at least some of these concerns, instead of using a peer-to-peer model, in one non-limiting exemplary embodiment, a new highly available trusted entity/service can be created to act as a clearinghouse to handle communications between and amongst the federated peers. In this way and assuming there is more than two peers, each peer can be isolated from the knowledge of which of the at least one other peer is handling a specific request. By adding in an additional level of indirection, all a federated peer knows is that one of its federated partners is associated with a particular DID/phone number/network identifier. This also allows for auditing, any billing for services charges, etc., that may need to occur between peer DFSPs to be centralized and anonymized. This also simplifies potential legal and business issues in creating federated associations, as each federated peer only has to establish a legal and/or business relationship with the at least one trusted Federated Facsimile Service Broker (FFSB), instead of between each of the federated peers.

Figure 8:
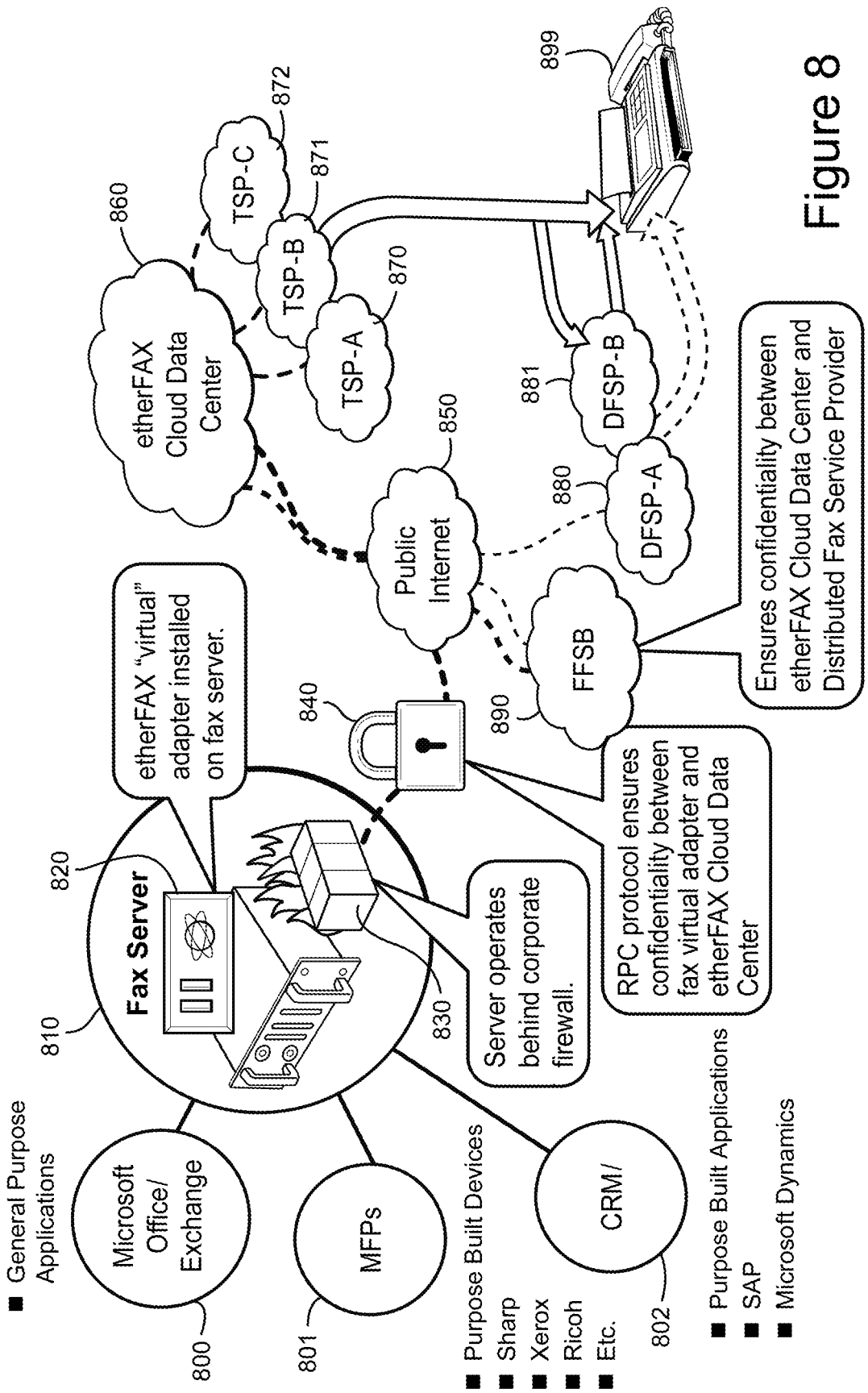
FIG. 8 is a schematic diagram depicting an example interconnect for the routing and exchange of facsimile information amongst and between at least one potentially dispersed and/or geographically distributed facsimile service provider (DFSP) via at least one federated facsimile service broker (FFSB).

FIG. 8 is an illustrative representation of the etherFAX® ecosystem interconnecting with at least one other peer distributed facsimile service provider (DFSP) through a federated facsimile service broker (FFSP). In the illustrative non-limiting embodiment, the etherFAX® architecture virtualizes the telephony service providers (870, 871, 872, etc.). By virtualizing the telephony service provider interface, the etherFAX® Data Center can circumvent the outward dialing and/or inward answering steps, with the use of traditional analog/modem signaling to establish communications with the at least one intended recipient of the communiqué, especially if the network identifier/phone number of the at least one recipient is serviced by at least one facsimile service provider associated with an FFSB.

In the exemplary non-limiting diagram FIG. 8, FFSB (890) and DFSP-A and/or DFPS-B (880, 881) are connected to the public Internet (850) that the etherFAX® cloud data center (860) has access to. Alternative network interconnect methodologies and configurations between the etherFAX® cloud data center (860), the at least one FFSB (890), and the at least one DFSP (880, 881) can be used. By federating services through an at least one federated facsimile service broker connected to at least one other distributed facsimile service provider organization, confidentiality of communiqués can be ensured across data network interconnects for customers serviced by a DFSP. From a business perspective, confidentiality of which of the at least one other DFSP is providing service to the at least one peer facsimile system (899) can also be limited within the confines of FFSB (890).

At a high level and as depicted in FIG. 8, in one illustrative non-limiting embodiment, a facsimile communications may originate by an application (800, 802) or purpose built device (801). The facsimile information is to be forwarded by an organization to a serving etherFAX® service center (860). In one exemplary embodiment, once an organization's policy has been applied (if any) to the communiqué and it is ready to be sent, an organization's fax server (810) contacts the etherFAX® cloud data center (860) through its virtualized adapter (820). The virtualized adapter (820) establishes a secure connection via an encrypted remote procedure call protocol such as HTTPS ensuring the confidentiality of the facsimile document itself and meta-data associated with any intended recipients of the communiqué to the etherFAX® data service center. Other layers of security may also be instantiated such as a virtual private network over the network interconnect that aids in following a security-in-depth methodology. Upon reception of the document, image, etc., in the non-limiting exemplary embodiment, the etherFAX® cloud data center (860) processes the request and initiates the routing of the transmission to its intended recipient. Based on the identifier, account information, and/or policy of the originating organization and/or the at least one intended recipient of the communiqué, the etherFAX® cloud data center (860) may instantiate a connection over the at least one telephony service providers (870, 871, 872). However, in an illustrative embodiment, the at least one etherFAX® cloud data center is also configured to communicate with at least one federated facsimile service broker (890). If the etherFAX® cloud data center (860) determines that the at least one FFSB (890) is an intended next hop for the at least one recipient of the communiqué, the etherFAX® cloud data center can circumvent the communications over the potentially insecure telephony service provider (870, 871, 872) interconnect. In lieu of this connection, the etherFAX® cloud data center (860) can establish a secure communications link to the at least one FFSB system (890) through the public Internet (850) or other data network interconnect (not shown). The secure connection between the etherFAX® cloud data center (860) and the FFSB (890) may be a persistent link and not established for each exchange. Over this secure communications link, the serving etherFAX® service center will transfer the communiqué to the FFSB (890). The at least one serving FFSB (890) can then securely transfer the communiqué with an at least one other federated DFSP (880, 881) that is associated with the at least one intended recipient facsimile system (899). This process shields the originating DFSP, in this non-limiting example, the etherFAX® cloud data center (860), from determining which of the at least one other DFSP is serving the particular DID/phone number/network identifier. Policy can be defined that further limits the length of time transaction information is kept at the FFSB (890), mitigating potential leakage of customer information between federated DFSP partners.

Once the DSFP has received the incoming facsimile communiqué, depending on the requirements of the originating and/or intended recipient organization and the capabilities of the peer DFSP (880, 881), transmission of the facsimile information may then travel over a telephony service provider interconnect that is associated with the DFSP (not shown) or better yet, over a secured communications link to the intended recipients facsimile system (899) (as with an etherFAX® service center (860)) further reducing exposure and helping ensure the confidentiality of the information across the transmission path. This exemplary, non-limiting embodiment also may reduce the cost of the communiqué to the parties, as any tariffs associated with the at least one telephony service provider may be circumvented. Communiqués in the reverse direction can travel a similar reverse path as the at least one etherFAX® cloud data center (860) can act as a peer distributed facsimile service provider coupled to at least one FFSB for other federated DFSPs.

Figure 9:
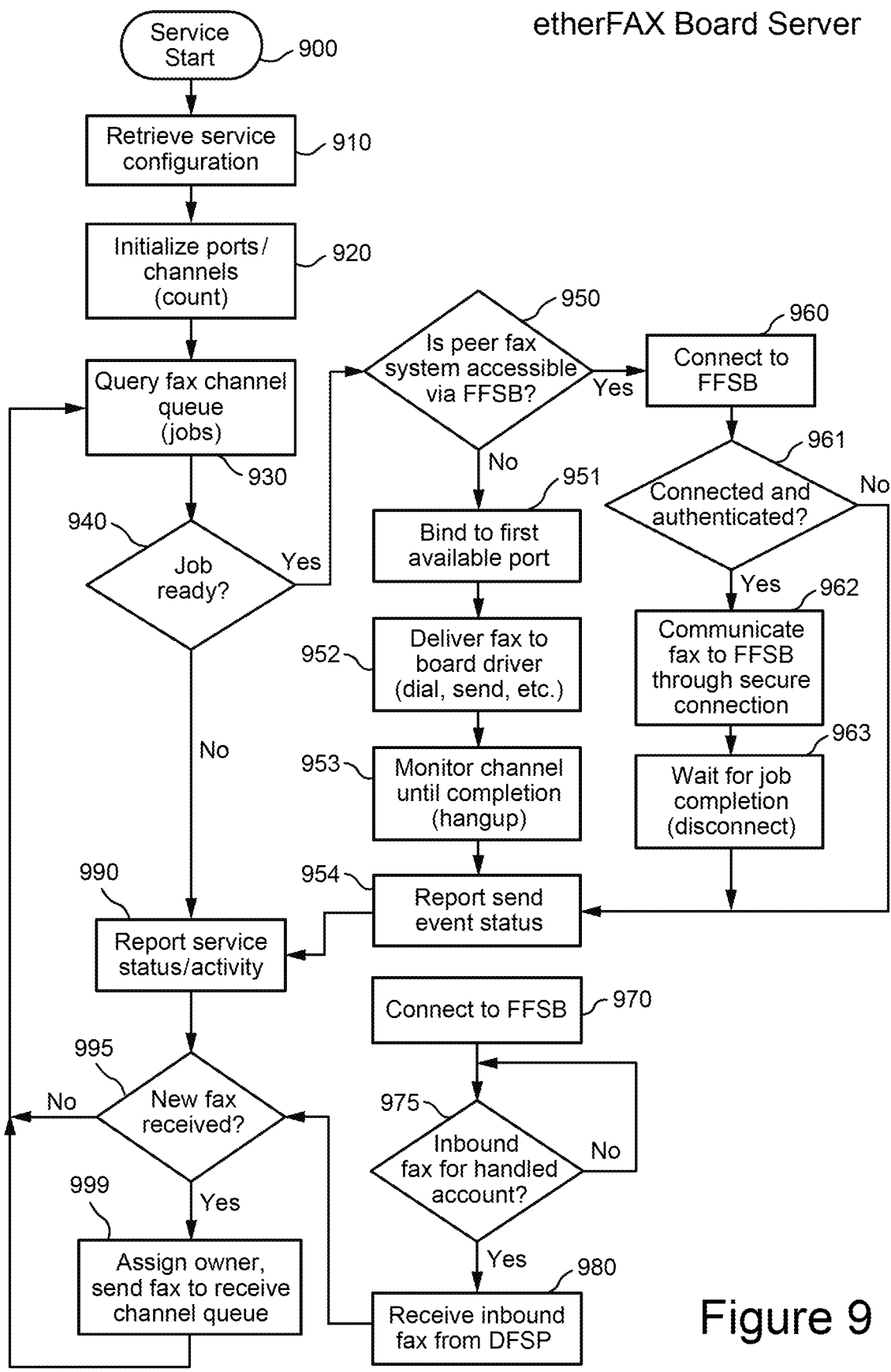
FIG. 9 is a schematic diagram depicting an example etherFAX® system communicating with at least one peer distributed facsimile service provider (DFSP) via at least one federated facsimile service broker (FFSB).

FIG. 9 represents a non-limiting exemplary high-level schematic block diagram of the board server logic augmented to communicate either with traditional telephony network service providers and/or federated facsimile service broker. The process outlined is similar to that of FIG. 7, however instead of communicating directly between peer distributed federated service providers, it communicates with the at least one federated facsimile service broker.

It is to be noted that in another non-limiting exemplary embodiment, a hybrid approach can also be envisioned, where the FFSB is used only as a lookup agent to determine which, if any DFSP can service the at least one phone number/DID/network identifier. The FFSB could then be configured to provide contact information for the at least one peer DFSP determined to be the next hop for the communiqué en route to its ultimate destination. This mitigates the need for all DFSP's to answer queries and/or distribute lists regarding any ids of peer facsimile systems they may be serving. The participating DFSPs only need to distribute/provide access to next hop information to the at least one FFSB that are within their individual domains.

In yet another non-limiting embodiment, in some traditional, third-party, or existing purpose built facsimile capable systems, integration and/or modification to include the functionality of an etherFAX® virtualized facsimile interface is not possible, potentially due to the architecture and/or the design of such a system. Therefore to enable these types of systems to take full advantage of the advanced features and improvements of the etherFAX® ecosystem, an analog to etherFAX® (A2E) bridging adapter can be coupled to the at least one of a traditional, third party, or existing facsimile system. FIG. 10 depicts a non-limiting illustrative embodiment of an etherFAX® A2E adapter and its operation and FIG. 10A shows an example non-limiting network interconnect view. In FIG. 10, a non-limiting exemplary facsimile capable device (10000) is normally coupled to an organization's or individual's telephony network interconnect. In one common illustrative use case, a user of facsimile capable device (10000) normally places any document(s) to be communicated into a document feeding tray, then enters the DID number of the at least one intended recipient peer facsimile capable system. The DID number may be entered manually, referenced from a store of frequently used contacts, etc. Others skilled in the art can easily envision other mechanisms that a facsimile capable device (10000) obtains the DID information of the at least one peer facsimile system. Once these steps are completed, there may be a requirement to initiate the send functionality.

Once the send operation has been initiated, facsimile capable device (10000), indicates it is about to place a call over the coupled telephony interconnect, for instance signaling its off-hook state. It then initiates the dial sequence for the selected DID number and waits for a connection to be established between itself and the at least one other corresponding peer facsimile capable system (not shown). Once the connection is established and trained for the characteristics of the line conditions and configuration, the facsimile capable device (10000) transmits the information to the at least one peer facsimile system. The user in this scenario has no way to verify, except after the fact, that the at least one receiving peer facsimile system is that of the intended recipient. All that can be known during the instantiation of the connection and transmittal of the document(s) is that at least one facsimile capable system answered the connection establishment request, and accepted the inbound transfer of document(s).

As previously described, this implied trust is based on the understanding that telephony interconnects have been traditionally controlled by mostly governmentally regulated/operated telephony carriers. Eavesdropping or hijacking of connections by nefarious or malicious parties were naively determined not to be of a major concern. However as technology continued to advance over the last century, sadly this implied trust is sometimes no longer warranted, as the paths between two corresponding facsimile systems is no longer via a direct end-to-end circuit interconnect with the at least one telephony carrier in control. The information being communicated may travel over diverse paths, over different network controlled by a plethora of network providers.

In one illustrative embodiment depicted by FIGS. 10 & 10A, an etherFAX® A2E adapter (10100) is added into the system. For brevity and the purposes of better understanding this explanation, the illustrative schematic diagram FIG. 10A shows an exploded view of the connectors on an exemplary configuration of an etherFAX® A2E adapter (items 10400, 10500, and 10600).

In this non-limiting exemplary embodiment, the telephone network wire (10900) that is attached to facsimile capable device (10000) is disconnected from the organization's or individual's telephony network jack it is connected to. Cable (10900) is then simply plugged back into the telephony interconnect (10400) jack on A2E adapter (10100). In this non-limiting illustrative embodiment, the telephony interconnect on A2E adapter (10100) emulates the necessary signaling of a local branch exchange, commonly referred to as a Foreign Exchange Office (FXO) interface. Because of this emulation, facsimile capable device (10000) believes it is still connected to a telephony network interconnect. The A2E adapter (10100) is then connected to the organization's or individual's data network via jack (10500) on device (10100).

Once power has been supplied to the A2E adapter to the power connect port (10600), the A2E adapter now enables the facsimile capable device (10000) to take full advantage of the advanced features of the etherFAX® ecosystem including secure transmittal of information to at least one other cooperating etherFAX® facsimile capable system (not shown).

In this configuration, the A2E (10100) adapter continues to allow facsimile capable system (10000) to operate as it previously did with no additional modification or configuration changes. No hardware changes are necessary other than ensuring there is a telephony network connection between facsimile capable device (10000) and A2E adapter (10100). When facsimile capable system (10000) is used to communicate a facsimile, the user continues to execute the same steps previously outlined. The A2E adapter (10100) emulates all the necessary signaling required to make the facsimile capable device (10000) believes it's connected to a telephony network interconnect. However in reality, A2E adapter (10100) is now transmitting the communiqué through the etherFAX® ecosystem, potentially taking full advantage of securing the information from the A2E adapter (10100) to any cooperating peer facsimile capable system (not shown) or at least one other A2E adapter (10100' not shown). In this non-limiting illustrative embodiment, the DID of the peer facsimile capable system (not shown) is captured by A2E adapter (10100) via the initial DTMF signaling generated by facsimile capable system (10000). The A2E adapter also implements the ITU T.30 standard protocol, further allowing facsimile capable system (10000) to transmit the communiqué. In this exemplary embodiment, the A2E adapter (10100) interpolates the T.30 protocol stream locally to maintain its strict timing requirements of the protocol, and then converts the exchange into using either of FAX® remotely available services. Other items such as the CSID of originating facsimile capable system are extracted from the T.30 protocol stream and passed along as arguments to the appropriate etherFAX® service.

If the receiving peer facsimile capable system not a participant within the etherFAX® ecosystem, communications still happens as it did previously, using standardized facsimile protocols. However instead of using the local telephony interconnect of the individual or organization, it is using the aggregated and possible distributed/federated facilities of the etherFAX® ecosystem, potentially reducing tariffs for the communiqué and total cost of ownership of the system.

If however the receiving peer facsimile system is an authorized participant within the etherFAX® ecosystem, the communiqué can be transferred securely between the originating A2E adapter (10100) and either another A2E adapter (10100' not shown) or an integrated virtualized facsimile interface if such other embodiments allow tighter integration (also not shown in FIG. 10).

Reverse communications follows a similar path where A2E adapter (10100) received indications from the etherFAX® services that and inbound facsimile communications is being received. In this non-limiting illustrative embodiment, A2E adapter (10100) emulates the FXO signaling to indicate to facsimile capable system (10000) that an inbound telephony network call is being received. Facsimile capable system (10000) then proceeds as it normally would without modification, to process the inbound facsimile communiqué. However in this exemplary embodiment, all T.30 protocol messaging is handled locally within A2E adapter (10100), again ensuring the strict timing requirements of the protocol be met for successful reception of the document. Due to advanced features, enhanced levels service can also be achieved. For instance, a receiving A2E adapter (10100) may have the knowledge that an originating facsimile capable device (10000'—not shown) is also a participant of the etherFAX® ecosystem the transmission was secured over the entire path. This could then be indicated to the receiving party by adding text into the header or footer of the page indicating the security disposition of the document. A secondary report page could be generated as the last page of the facsimile communiqué. Those skilled in the art can easily envision other mechanisms where the security disposition of the transmission can be attained from A2E adapter (10000) or the etherFAX® services with requiring additional modification of facsimile capable device (10000).

Ensuring security of facsimile communiqué between endpoints alone is a boon to many industries such as medical, financial, insurance, etc., where personal information is regularly exchanged between different intra and inter organizational offices or between individuals and organizations. The A2E adapter (10100) enables authentication of each endpoint and encryption of the data between the at least two facsimile capable systems. Meta data about exchange is also protected and not inadvertently leaked as a facsimile communiqué traverse different networks such as networks (10700) and (10800). The meta-data is only exposed within the at least one etherFAX® service center (10300) for routing the information to a peer facsimile capable system. All a nefarious or malicious party may garner is that the facsimile capable system (10000) is communicating with the etherFAX® service center (10300).

A major advantage of this illustrative solution, is it not requiring any additional training of the at least one operator of facsimile device (10000). Businesses and individuals can continue to use their facsimile system (10000) in the same manner as they previously did, but avail themselves of the enhanced functionality and levels of service provided by the etherFAX® ecosystem.

It can be easily envisioned by those skilled in the art that many other advantageous use cases can be contemplated. For instance, in another illustrative example the A2E adapter (10100) could enforce a whitelist or blacklist of peer facsimile that can be communicated with. It could also be configured to only instantiate communications with other cooperating peer facsimile capable systems that are part of the etherFAX® ecosystem ensuring secure communications over the networks interconnects such as networks (10700) and (10800). It could be configured to enforce time of day semantics, such that communications can only happen during certain periods. Other policy enforcement attributes can be added with no modification to facsimile capable device (10000). The policy information could be centrally administrated within the etherFAX® ecosystem, or directly on the A2E adapter (10100) itself. It could also provide extended error, or configuration information back by locally generating an inbound fax document to be received by the attached facsimile system (10000). The A2E adapter (10100) could also expose a management interface via its data network connection.

It should also be understood that the connectors on the back of A2E adapter are exemplary only and considered non-limiting. Maybe the A2E adapter (10100) connects to the data network via a wireless interconnect such as 802.11, or in mobile situations via a wide area cellular or satellite wireless interconnect (GSM, LTE, Iridium, etc.). Alternative methods could be envisioned for the telephony interconnects such as Bluetooth, or Near Field communication protocols.

In yet another non-limiting embodiment, the A2E adapter (10100) could present alternate signaling interfaces to allow seamless integration with other traditional or third party facsimile equipment or software applications. In one potential exemplary embodiment, instead of presenting an analog like telephony interface as depicted in FIG. 10, A2E adapter (10100) may emulate an industry standard digital to analog Modulator/Demodulator interface, more widely known as a facsimile capable modem. In this manner, the A2E adapter (10100) would enable communications either wirelessly or via hardware cable that presents an industry standard Hayes style "AT" command and data interface to facilitate the instantiation of facsimile communications from third party software applications running on general or purpose built computing platforms such as smartphones, tablets, laptop, desktop, and/or server based systems. However instead of an A2E adapter (10100) being a digital to analog bridging mechanism that connects to a telephony network interconnect. The A2E adapter (10100) would be a digital to digital interface, abstracting industry standard Hayes "AT" commands such as to dial, send and/or receive facsimile data, and/or disconnect, and mapping them into equivalent remotely accessible etherFAX® services. A non-limiting exemplary use case for such an A2E design might be a kiosk system setup in airports, hotels, convention centers, or other such venues were a user might wirelessly connect with an A2E adapter (10100) to send or receive a facsimile from their smartphone, laptop, or other portable computing device. Users in this case could continue to use their favorite or installed third-party application and still benefit from the improvements and advantages of the etherFAX® ecosystem previously outlined.

Considering the plethora of places that an etherFAX® A2E adapter and/kiosk may be installed, a connection to an external AC/DC power source (10600) may be less than optimal. In another illustrative embodiment, power for the operation of A2E adapter (10100) may also be supplied over the data network connector such as Power Over Ethernet (POE), or drawn from USB interconnect. Other internal power sources could be integrated such as solar, fuel cell, battery, or other renewable energy resources. Recharging capabilities for these alternative power solutions could also be supplied through inductive sources, replacement of fuel cell or battery cartridges, etc.

With the advantages of non-limiting embodiments in mind, additional improvements can be realized. Because the etherFAX® ecosystem now blurs the lines between telephony and data network interconnects, the endpoint addressing scheme used by existing and/or third party facsimile capable systems can be easily extended. In one exemplary non-limiting embodiment, no longer does a Direct Inward Dialing (DID) number have to represent a traditional PSTN phone number. The etherFAX® federated model can use that DID value to determine whether an end point is a participant of a federated interconnect that may provide additional security of the information enroute between the at least two cooperating peer facsimile capable systems.

One can consider other potential enhancements. For instance, in the North American Numbering Plan (NANP), numbers starting with 0 or 1 are disallowed, or reserved. In one illustrative embodiment, this knowledge gives rise to the capability to having these disallowed numbers values be mapped to extended and/or improved levels of service.

In another non-limiting exemplary use case, consider how integral facsimile services are to the healthcare industry. Documents containing very personal and private information, are communicated by facsimile services between doctors, patients, hospitals, insurance companies, and other ancillary service providers by the millions daily.

Now consider that in the United States, the 1996 Health Insurance Portability and Accountability Act (HIPPA) requires for this personal information not only to remain private and secured at the end points, but also while it is in transit over electronic base communications methodologies. As describe previously, traditional facsimile communications services have limited ability to shield itself from attacks by nefarious parties. The implied trust of the "telephony connection" is less than optimal in this and other comparable use cases.

Another requirement of the HIPAA regulations is the need for each medical service provider to be assigned a National Provider Identifier (NPI). The NPI must be used with the electronic transactions identified in HIPAA. These numbers are controlled by an assigning number authority known as the Centers for Medicare and Medicaid Services (CMS) By convention, according to CMS, these numbers are 10 digits in length and begin with a 1.

In one exemplary non-limiting illustrative embodiment, to address the security issues surrounding keeping the data private during transmission and between authenticated sources, the etherFAX® ecosystem can be combined with directory enabled networking capabilities hosted internally or accessed through its federated extensions. To people skilled in the arts, it can be easily envisioned that the NPI numbers can be mapped with the NANP numbers with any contention due to the conventions of the numbering schemes. If at least two medical providers avail themselves of the etherFAX® ecosystem of services, the NPI numbers can be used to identify and route facsimile communications with the at least one other peer facsimile capable system associated with a peer medical provider. In this exemplary embodiment, integrating access to CMS's, another third party, or an internal database containing NPI numbers that is linked to etherFAX® federated services, the medical providers can maintain compliance with HIPPA regulations to keep the facsimile communicated information confidential while in transit.

Figure 11:
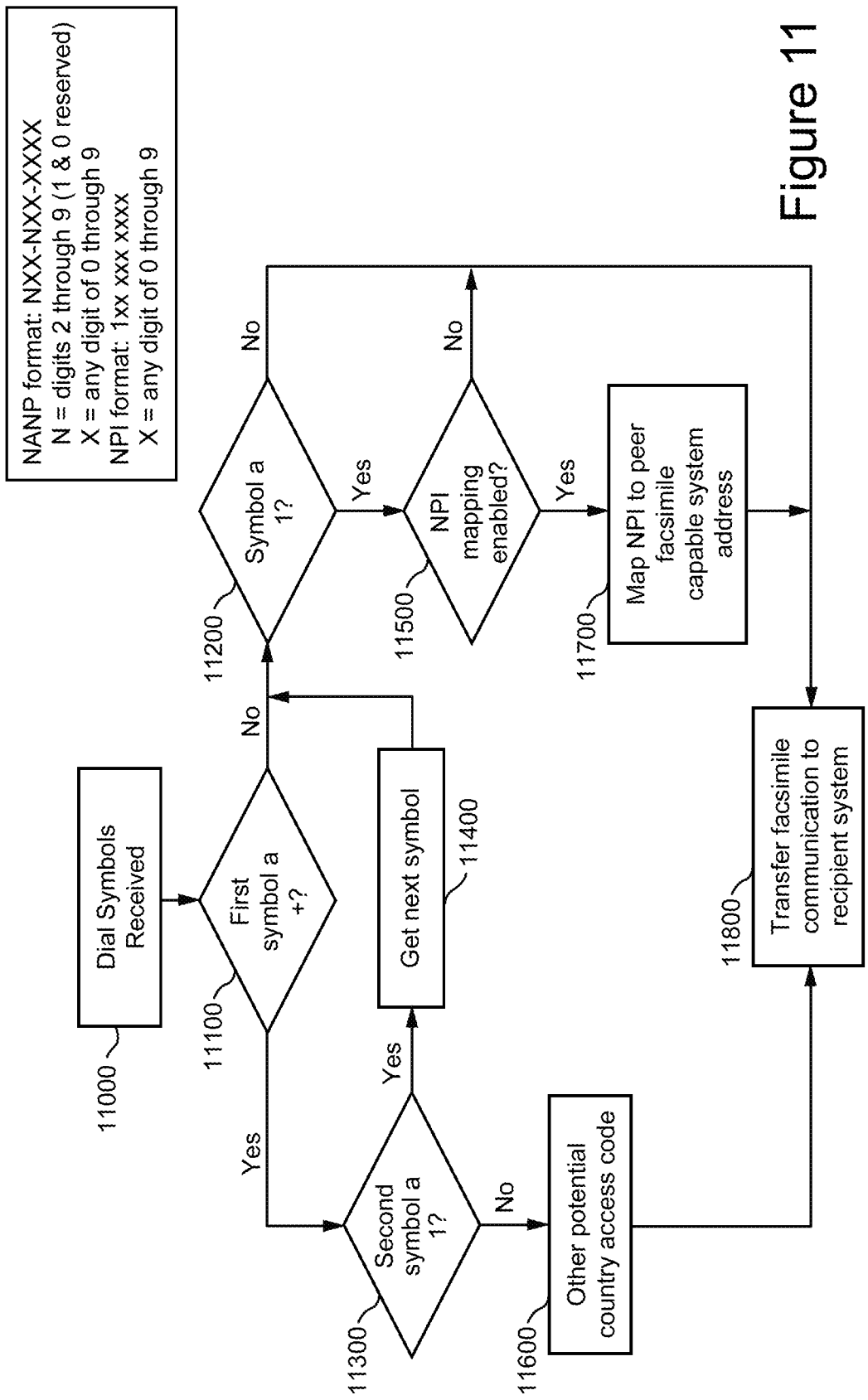
FIG. 11 is a schematic diagram depicting an overlay scheme for peer endpoint addressing and/or routing to enable directory enabled secure or enhanced facsimile communications.

FIG. 11 represents a non-limiting exemplary embodiment of the potential logic decision tree used in detecting the overlay of the NPI numbers when processing digits for routing a facsimile communiqué. Either as the addressing symbols are received or once all the addressing symbols are received, the logic at step (11000) is invoked. For clarity, these description is made using ASCII symbols. It is to be noted though this is to be interpreted as non-limiting, as the symbols being processed may be represented/received in other forms such as DTMF, etc. Continuing with the non-limiting exemplary embodiment, first, a check is made to see if the first addressing symbol is the standard prefix to indicate the presence of a country code, the ASCII+ symbol (11100). If the symbol is determined to not be an ASCII+ symbol, the logic continues to determine if the symbol being processed is an ASCII 1 numeric symbol (11200). If the symbol is determined not to be a ASCII numeric 1 symbol, the system proceeds to route the facsimile communiqué to the address of the at least one peer facsimile system (11800). If however the symbol is determined to be an ASCII numeric 1 symbol, a check is made to determine if NPI mapping is enabled for the account, device and/or communiqué. If NPI mapping is disabled, again the system proceeds to try and route the facsimile communiqué to the provided at least one peer system's address (11800). If however NPI mapping is enabled, the system does a mapping (11700) of the entire NPI number to find the correct routing information to transfer the facsimile communiqué to the at least one corresponding facsimile capable system (11800). As previously describe, this mapping could be done internally by a single etherFAX® service center or through its distributed/federated services or both. For instance in one non-limiting embodiment, if the communiqué is an intra-organizational communication, it could be handled entirely within one etherFAX® service center. In another non-limiting embodiment, if the communiqué is an inter-organizational communication, it may require the assistance of the etherFAX® federated/distributed services to determine a route to the at least one corresponding facsimile capable system. Depending on the routing and/or policy requirements, security of the communiqué could be enhanced for the communiqué if the at least one corresponding peer facsimile capable system also employs the services of etherFAX®.

In the non-limiting embodiment, if the first addressing symbol is determined to be an ASCII+ symbol, the logic proceeds to step (11300). A check is then made to see if the next addressing symbol received is an ASCII numeric symbol 1. If the symbol is determined to be an ASCII numeric symbol 1, this indicates that the international standard country code prefix for the US is present. The logic then proceeds to get the next symbol at step (11400) and then continues to join the previously described process at step (11200). If however the symbol is determined not to be an ASCII numeric symbol 1 at step (11300), the addressing symbols being processed could represent a different country code than the US. Here the non-limiting exemplary embodiment continues to step (11600) and ultimately to step (11800) to continue to route the facsimile communiqué to the at least one corresponding peer facsimile capable system.

Additional schemes such as this can be easily envisioned by those skilled in the art. For instance in another exemplary embodiment, other extensions can be implemented around the International Telecommunications Union's Telecommunications Standardization Sector (ITU-T) E.164 numbering plan. In one exemplary embodiment, any numbers prefixed with +0 can potentially be mapped into alternative routing schemes, priority, level of service, etc. Additional prefixes, suffixes that include encoding of standard DTMF symbols (0-9, *, #) can be used to enable or disable extended features of the etherFAX® ecosystem. Alternatively, E.164 numbers could be mapped to Internet based address through a simple Domain Name Service lookup via the e164.arpa domain (https://en.wikipedia.org/wiki/Telephone_number_mapping), further removing the need for connectivity over telephony based carrier networks. It will also be appreciated that software integration with exposed etherFAX® remote services, allows for the symbols used for identifying peer nodes beyond the standard DTMF symbols to any available character set such as the standard alphanumeric UTF-8 encoding.

It is to be understood that other determining procedures and/or parsing logic can be envisioned. For instance, in another non-limiting exemplary embodiment, the incoming addressing symbols converted from an abbreviated addressing sequence (e.g. no country code prefix for in country dialing, using the + symbol to eliminate leading symbols, etc.) to a full E.164 representation. The E.164 representation can then be processed through a similar decision tree as depicted in FIG. 11. Based on policy and configuration, the etherFAX® architecture enables the ability to map, overlay, and/or interpret alternate address methodologies for determining at least one route between an originating device initiate communications to an at least one peer system capable of receiving a communiqué.

The number plan overlay/extensions describe in the preceding non-limiting illustrative embodiments may only be enabled on an account, device, and/or communiqué basis, allowing for alternative overlays, routing schemes, or enhancements to be integrated into the etherFAX® architecture.

In yet another non-limiting illustrative embodiment, as part of the authentication process to ensure a facsimile capable system is owned and/or operated by a particular individual organization, a multi-factor authentication scheme could be used. In one non-limiting exemplary embodiment, the etherFAX® services could generate an inbound facsimile communiqué to a facsimile capable device that a customer has registered. This communiqué can contain a passphrase, pin, or some other unique token of information that the customer would then have to reenter into the etherFAX® customer portal. This would allow an out-of-band authentication, ensuring that the customer has access to the receiving and/or originating facsimile capable system that was registered. Depending on the level of service, this could be done once at account registration time, or on a facsimile communiqué by communiqué basis, depending on the security requirements.

Instead of having to receive a unique token from the etherFAX® services for authentication purposes, and then providing this information back to the etherFAX® services, other potential solutions also exist. In yet another non-limiting exemplary embodiment, secure-tokens such as YubiKey or RSA secure tokens can be used. In one example, using the A2E adapter (10100) of FIG. 10 could have an NFC (10450) interface or a USB interface that would enable outbound and inbound communications with facsimile capable device (10000) while a YubiKey or other hardware token is coupled wired or wirelessly to A2E adapter (10000). For software or pseudo random tokens, the values could be entered as part of the DID dial string entered by a user to facsimile capable device (10000). In a non-limiting exemplary embodiment, a user may initiate a send operation to communicate this token information to the A2E adapter (10100) prior to receiving an inbound facsimile communiqué or as a prefix and/or suffix for sending an outbound facsimile communiqué. Alternate scenarios of how to integrate multi-factor authentication with traditional, existing, or third-party facsimile solutions can be easily envisioned by those skilled in the art.

In the effort to evolve facsimile communications beyond the basic/standard capabilities, methodologies, and protocols, in yet another non-limiting exemplary embodiment, the etherFAX® ecosystem provides the ability for each cooperating peer facsimile capable system to query any potential extended features and/or enhancements of the at least one additional cooperating peer facsimile capable system. In one non-limiting illustrative embodiment, upon registration with the at least one etherFAX®, distributed facsimile service provider, and/or federated facsimile service broker center, a cooperating peer facsimile capable system can publish a list of extended features and capabilities that other cooperating peer facsimile capable systems can take advantage of. FIG. 12 is an illustrative non-limiting representation of additional attributes that could be registered/recorded/communicated about a particular cooperating peer facsimile capable system. As shown in FIG. 12, such parameters may include but are not limited to:

Route
FID
Status
Accepted Formats
Public Key
Encryption Algorithms
Other

Prior to the transmittal of a facsimile communiqué, an at least one cooperating peer facsimile capable system can query the list of extended features or capabilities for the at least one intended destination of the communiqué. Based on this information, the originating cooperating facsimile capable system could avail itself of at least one of the enhancements supported by the at least one cooperating peer facsimile capable system, potentially reducing the consumption of resources and/or enhancing the utility of the information being communicated.

Because of the ability to query the enhanced capabilities a priori of the transmission of the communiqué, in one non-limiting exemplary embodiment the format in which the data is communicated in could be determined. In such an arrangement, the at least one intended destination cooperating peer facsimile system may have registered that it could receive documents in the standard portable document format (PDF) instead of the more common facsimile Tagged Image File Format (TIFF) format. Armed with this knowledge, the originating cooperating peer facsimile capable system might skip the transcoding step from PDF to TIFF and submit the original PDF document for transmittal between the at least two cooperating peer facsimile capable systems. Similar illustrative embodiments could transport other types of documents such as high quality X-rays for healthcare environments enabling the consumers of the information to not be hampered by a transcoding process that could devolve the communicated data into a lower resolution, potentially reducing the usefulness of the information.

In one non-limiting exemplary embodiment, having the ability to determine the capability of the at least one cooperating peer facsimile systems, an originating cooperating peer facsimile system could use the etherFAX® ecosystem as a way to communicate data stored in commonly used data formats. For instance, data formats that could be communicated could include, but not limited to common file formats listed at: https://en.wikipedia.org/wiki/List_of_file_formats or mime types as specified by IANA in IEFT RFC 6838 at http://www.iana.org/assignments/media-types/media-types.xhtml. Audio or video samples could also be communicated via similar mechanisms if the destination endpoint supports the reception of such information. Other alternative embodiments and information formats can be easily envisioned by those skilled in the art.

In yet another embodiment, security of transmitted information could be further enhanced. In one exemplary embodiment, during the registration processes, the at least one cooperating facsimile capable system could advertise a public key to be used for ciphering information. An at least one cooperating peer facsimile system could then enquire about the public key of the intended destination of a communiqué. Based on the knowledge of the public key, using techniques such as public key encryption, or through a Diffie-Hellman exchange executed via the etherFAX® ecosystem, symmetric or asymmetric ciphering algorithms could add an additional layer of security for the information during transmission and/or while it is at rest, further protecting the data from nefarious or malicious parties. A potential advantage of this arrangement might include the mitigation of the need for the external distribution of public keys between cooperating peer systems, although it would not be prohibited in some embodiments. Depending on the negotiation between endpoints, ephemeral keys could be determined, enabling perfect forward secrecy of each communiqué. Methods for key exchange and the type of ciphering algorithms include, but not limited to the Advanced Encryption Standard (AES), Elliptic Curve cryptography, Diffie-Hellman key exchange, and RSA key distribution schemes. By no means is this an exhaustive list of security/ciphering algorithms, and should not be interpreted to be limiting. Additional cryptographic embodiments can be easily envisioned by those skilled in the art.

To support this level of enhanced communications between the at least two cooperating peer facsimile systems, in one illustrative embodiment, the cost constructs for the communications may be modified. In the exemplary embodiment, instead of a customary per page charge associated with facsimile communications, costs may be determined on a message or per byte basis. Statistical, error, and diagnostic information would be modified accordingly. For instance, in one non-limiting illustrative embodiment, if the intended peer facsimile system was incapable of receiving a specific data format, the originating cooperating facsimile capable system may opt to transcode the data from its original format into the least common denominator standard TIFF format, or terminate the request entirely.

The enhancements outlined in the exemplary embodiment would continue to allow consumers of the etherFAX® ecosystem to reference the at least one peer facsimile system via associated telephony based addressing, regardless of the type of data being communicated, further blurring the lines between data and telephony network infrastructure.

Embodiments may be implemented in hardware, software, firmware, or combinations thereof.

Embodiments may also be deployed in multiple devices or in a single device.

Embodiments may also be configured wherein elements of fax server technology and/or the etherFAX® virtual driver (210) may be implemented totally within general applications (230), purpose built applications (250) and/or devices (240), thus not requiring the services of an intermediary fax server (200). These modifications allow for communications to happen between general applications (230), purpose built applications (250) and/or devices (240) and the etherFAX® cloud data center (260).

It will be readily understood by those skilled in the art that the technology enables additional advantage that may be realized by an organization or customer, as they can now avail themselves of the aggregated services offered by the etherFAX® cloud data center (260), providing them access to solutions not previously available with increased economies of scale. Without these advantages set forth, the total cost of replicating these services by the customer or organization may be cost prohibitive, potentially putting an organization or customer at a competitive disadvantage.

It will be readily understood by those persons skilled in the art that the technology is susceptible to broad utility and application. Many embodiments and adaptations other than those described, and many variations, modifications and equivalent arrangements, will be apparent from or reasonably suggested by the foregoing description thereof, without departing from the substance or scope.

While the foregoing illustrates and describes exemplary embodiments of this non-limiting embodiment, it is to be understood that the non-limiting embodiment is not limited to the construction disclosed. The technology can be embodied in other specific forms without departing from its spirit or essential attributes. While the non-limiting embodiment has been described with what is presently considered the most practical and preferred embodiments.

We claim:

1. In a federated computing architecture, an enhanced facsimile communications environment that enables transfer of at least one of (a) a document, (b) an origination identifier, (c) data, and (d) policy attribute information between at least first and second cooperating peer facsimile capable systems, the environment comprising:

a plurality of Distributed Facsimile Service Providers (DFSP) including a first DFSB and a second DFSB, the first DFSB at least configured to communicate with the first cooperating peer facsimile capable system, the second DFSB at least configured to communicate with the second peer facsimile capable system; and at least one Federated Facsimile Service Broker (FFSB) that is configured to register the first and second DFSPs;

the first DFSP being configured to receive routing information and at least one of (a) the document, (b) the origination information, (c) the data, and (d) the policy attribute, from the first cooperating facsimile capable peer system destined for the second cooperating facsimile capable peer system;

the at least one FFSB being configured to receive the routing information from the first DFSP and to use the received routing information to query whether any of the plural DFSPs are capable of communicating with the second peer facsimile capable system, the at least one FFSB being configured to notify the first DFSB in response to a successful query that the second DFSP is capable of communicating with the second peer facsimile capable system;

the first DFSP being structured to perform operations comprising:

(i) upon reception of the routing information from the first cooperating facsimile capable peer system, communicating with the at least one FFSB to determine whether another DFSB is capable of communicating the at least one of (a) document, (b) origination identifier, (c) data, and (d) policy attribute information to the second cooperating facsimile capable peer system, (ii) determine based on such received policy attribute information whether the at least one of (a) document, (b) origination identifier and (c) data requires further processing;

(iii) in response to notification from the FFSB that the second cooperating facsimile capable peer system is accessible by the second DFSP, transferring the routing information and at least one of (a) the document, (b) the origination information, (c) the data, and (d) the policy attribute information to the second DFSP; and (iv) upon the successful transfer of the routing information and the at least one of (a) the document, (b) the origination information, (c) the data, and (d) the policy attribute information to the second DFSP, delegating to the second DFSP communications to the second cooperating facsimile capable peer system of the at least one of (a) the document, (b) the origination information, (c) the data, and (d) the policy attribute information.

2. The environment of claim 1, wherein the at least one Federated Facsimile Service Broker is configured to communicate the at least one of (a) document, (b) origination identifier, (c) data, and (d) pertaining policy information between the first DFSP and the second DFSP.

3. The environment of claim 1, wherein at least one of the first and second peer facsimile capable systems comprises a facsimile machine.

4. The environment of claim 1, wherein at least one of the first and second peer facsimile capable systems comprises a facsimile server.

5. The environment of claim 1, wherein at least one of the first and second peer facsimile capable systems comprises a communications adapter.

6. The environment of claim 1, wherein the plurality of DFSBs and the FFSB are in the cloud.

7. In a federated computing architecture, an enhanced facsimile communications environment that enables transfer of at least one of (a) a document, (b) an origination identifier, and (c) data between at least first and second cooperating peer facsimile capable systems, the environment comprising:

a first Distributed Facsimile Service Providers (DFSP) that is at least able to communicate with a first cooperating facsimile capable peer system;

the first DFSP being configured to receive routing information and at least one of (a) the document, (b) the origination information, and (c) the data from the first cooperating facsimile capable peer system destined for a second cooperating facsimile capable peer system;

the second cooperating facsimile capable peer system being accessible by at least a second DFSP;

the first DFSP being structured such that: upon reception by the first DFSP of the routing information from the at least one cooperating facsimile capable peer system, the first DFSP determining if the second cooperating facsimile capable peer system is accessible by the second DFSP;

upon determining that the second cooperating facsimile capable peer system is accessible by the second DFSP, the first DFSP transferring the routing information and at least one of (a) the document, (b) the origination information, and (c) the data to the second DFSP; and upon the successful transfer of the routing information and the at least one of (a) the document, (b) the origination information, and (c) the data to the second DFSP, the first DFSP delegating communications of the at least one of (a) the document, (b) the origination information, and (c) the data to the second cooperating facsimile capable peer system to the second DFSP.

8. The environment of claim 7, wherein the second Distributed Facsimile Service Provider provides status information of the delegated communications of the at least one of (a) the document, (b) the origination information, and (c) the data to the first DFSP.

9. The environment of claim 7, wherein the second Distributed Facsimile Service Provider determines if the second cooperating facsimile capable peer system is addressable.

10. In a federated computing architecture that enables transfer of at least one of (a) a document, (b) an origination identifier, (c) data, and (d) policy attribute information between at least first and second cooperating peer facsimile capable systems, the architecture comprising a plurality of Distributed Facsimile Service Providers (DFSPs) and a Federated Facsimile Service Broker (FFSB) configured to register the first and second DFSPs, the plurality of DFSPs including a first DFSB and a second DFSB, the first DFSB configured to communicate with the first cooperating peer facsimile capable system, the second DFSB configured to communicate with the second cooperating peer facsimile capable system, the FFSB being configured to receive the routing information and use the received routing information to query whether any of the plural DFSPs are capable of communicating with a peer facsimile capable system associated with the routing information;

the first DFSP comprising at least one processor configured to perform operations comprising:

(i) receive routing information and at least one of (a) the document, (b) the origination information, (c) the data, and (d) the policy attribute, from the first cooperating facsimile capable peer system;

(ii) determine based on such received policy attribute information whether the at least one of (a) document, (b) origination identifier and (c) data requires further processing, (iii) communicate with the at least one FFSB to determine whether another one of the plurality of DFSBs is capable of communicating with the second cooperating facsimile capable peer system, (iv) receive a notification from the at least one FFSB in response to a successful query that another one of the plurality of DFSPs is capable of communicating with the second peer facsimile capable system, (v) based on the notification, transferring the routing information and at least one of (a) the document, (b) the origination information, (c) the data, and (d) the policy attribute information to said another one of the plurality of DFSPs; and (vi) upon the successful transfer of the routing information and the at least one of (a) the document, (b) the origination information, (c) the data, and (d) the policy attribute information to said another one of the plurality of DFSPs, delegating to said another one of the plurality of DFSPs, communication of the at least one of (a) the document, (b) the origination information, (c) the data, and (d) the policy attribute information.

11. The first DFSB of claim 10, wherein the first DFSB communicates the at least one of (a) document, (b) origination identifier, (c) data, and (d) pertaining policy information to the FFSB so the FFSB can communicate the at least one of (a) document, (b) origination identifier, (c) data, and (d) pertaining policy information to the another one of the DFSPs.

* * * * *